(12) United States Patent
Chen et al.

(10) Patent No.: US 9,513,534 B2
(45) Date of Patent: Dec. 6, 2016

(54) MOBIL DEVICE AND OPTICAL IMAGING LENS HAVING FOUR LENS ELEMENTS THEREOF

(71) Applicant: GeniuS Electronic Optical Co., Ltd., Taichung (TW)

(72) Inventors: Yan Bin Chen, Fujian (CN); Long Ye, Fujian (CN); Feng Chen, Fujian (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/279,880

(22) Filed: May 16, 2014

(65) Prior Publication Data

US 2015/0153543 A1   Jun. 4, 2015

(30) Foreign Application Priority Data

Nov. 29, 2013 (CN) .......................... 2013 1 0629285

(51) Int. Cl.
| | | |
|---|---|---|
| *G02B 13/18* | (2006.01) | |
| *G02B 3/02* | (2006.01) | |
| *G02B 9/34* | (2006.01) | |
| *G03B 13/32* | (2006.01) | |
| *G02B 13/00* | (2006.01) | |

(52) U.S. Cl.
CPC ............. *G03B 13/32* (2013.01); *G02B 13/004* (2013.01)

(58) Field of Classification Search
CPC .. G02B 13/18; G02B 15/173; G02B 13/004; G02B 13/001
USPC ......................................... 359/773, 772, 715
See application file for complete search history.

(56) References Cited

U.S. PATENT DOCUMENTS

| | | | |
|---|---|---|---|
| 7,453,654 B2 | 11/2008 | Shinohara | |
| 7,477,459 B2 | 1/2009 | Liao | |
| 7,660,049 B2 | 2/2010 | Tang | |
| 7,777,972 B1 | 8/2010 | Chen | |
| 7,848,032 B1 | 12/2010 | Chen | |
| 7,911,715 B2 | 3/2011 | Shinohara | |
| 8,014,080 B1 | 9/2011 | Chen | |
| 8,179,616 B1 | 5/2012 | Hsu | |
| 8,274,593 B2 | 9/2012 | Chen | |
| 8,395,691 B2 | 3/2013 | Tang | |
| 8,498,064 B2* | 7/2013 | Okano | G02B 13/004 |
| | | | 348/335 |
| 2011/0261471 A1 | 10/2011 | Taniyama | |
| 2012/0140339 A1 | 6/2012 | Huang | |
| 2012/0327522 A1* | 12/2012 | Tsai | G02B 13/004 |
| | | | 359/715 |

(Continued)

FOREIGN PATENT DOCUMENTS

| | | |
|---|---|---|
| CN | 202256846 | 5/2012 |
| JP | 2011095301 | 5/2011 |
| TW | M354079 | 4/2009 |

(Continued)

OTHER PUBLICATIONS

Official Action from Chinese Patent Application No. 201310629285.0 dated Aug. 27, 2015.

*Primary Examiner* — Alicia M Harrington
(74) *Attorney, Agent, or Firm* — Baker & McKenzie LLP

(57) ABSTRACT

An optical imaging lens for a mobile device comprising four lens elements positioned sequentially from an object side to an image side. By controlling the convex or concave shape of the surfaces of the lens elements, the optical imaging lens may exhibit better optical characteristics. Furthermore, the total length of the optical imaging lens may be shortened.

15 Claims, 33 Drawing Sheets

(56) References Cited

U.S. PATENT DOCUMENTS

2013/0044379 A1 2/2013 Hsieh
2013/0107378 A1 5/2013 Kubota

FOREIGN PATENT DOCUMENTS

| TW | I309727 | 5/2009 |
|---|---|---|
| TW | M356116 | 5/2009 |
| TW | M356127 | 5/2009 |
| TW | M360369 | 7/2009 |
| TW | 201109712 | 3/2011 |
| TW | 201137429 | 11/2011 |
| TW | 201215910 | 4/2012 |
| TW | 201217853 | 5/2012 |
| TW | 201300828 | 1/2013 |
| TW | 201303352 | 1/2013 |

\* cited by examiner

| f(Focus)= 3.760mm, HFOV(Half angular field of view)= 36.527 deg., System length= 4.562mm, Fno= 2.433, Image Heigh=2.856mm | | | | | | | |
|---|---|---|---|---|---|---|---|
| Surface # | | Radius | Thickness | Refractive index | Abbe number | Material | Focus |
| - | Object | ∞ | ∞ | | | | |
| 100 | Aperture stop | ∞ | -0.210 | | | | |
| 111 | 1st lens element | 1.394 | 0.631 | 1.544 | 56.114 | plastic | 2.249 |
| 112 | | -8.663 | 0.080 | | | | |
| 121 | 2nd lens element | -3.680 | 0.246 | 1.636 | 23.972 | plastic | -4.172 |
| 122 | | 9.992 | 0.653 | | | | |
| 131 | 3rd lens element | -1.618 | 0.763 | 1.535 | 55.635 | plastic | 2.151 |
| 132 | | -0.784 | 0.118 | | | | |
| 141 | 4th lens element | -8.065 | 0.601 | 1.535 | 55.635 | plastic | -2.036 |
| 142 | | 1.296 | 0.400 | | | | |
| 151 | IR cut filter | ∞ | 0.300 | | | | |
| 152 | | ∞ | 0.769 | | | | |
| 160 | Image plane | ∞ | | | | | |

FIG. 4

| Aspherical parameters | | | | |
|---|---|---|---|---|
| Surface # | 111 | 112 | 121 | 122 |
| K | -1.19904E+00 | 9.05341E+01 | -6.08971E+01 | -2.95283E+02 |
| $a_4$ | 1.50956E-03 | 1.08929E-01 | 2.25244E-01 | 4.24225E-01 |
| $a_6$ | 2.89942E-01 | -2.46175E-01 | -2.93232E-01 | -5.70071E-01 |
| $a_8$ | -8.73436E-01 | 1.32718E-01 | -3.63876E-01 | 8.45075E-01 |
| $a_{10}$ | 8.18994E-01 | -1.27166E+00 | 1.05463E+00 | -3.90833E-01 |
| $a_{12}$ | 1.00060E+00 | 2.54188E+00 | -2.58296E+00 | -1.73877E+00 |
| $a_{14}$ | -2.84779E+00 | -1.68450E+00 | 4.47262E+00 | 3.83990E+00 |
| $a_{16}$ | 1.52328E+00 | 2.56473E-01 | -2.62911E+00 | -2.19354E+00 |
| Surface # | 131 | 132 | 141 | 142 |
| K | 1.73902E+00 | -2.64903E+00 | 9.44632E+00 | -1.02225E+01 |
| $a_4$ | -1.94472E-02 | -1.37725E-01 | -1.84538E-02 | -8.27063E-02 |
| $a_6$ | 2.66343E-02 | 2.36149E-02 | -2.86664E-03 | 4.07688E-02 |
| $a_8$ | 1.32762E-01 | 5.11656E-02 | 1.42220E-02 | -1.71185E-02 |
| $a_{10}$ | -4.13662E-01 | -9.98120E-02 | -6.77519E-03 | 4.74475E-03 |
| $a_{12}$ | 6.27712E-01 | 8.21151E-02 | 1.49447E-03 | -8.06995E-04 |
| $a_{14}$ | -4.01981E-01 | -2.02352E-02 | -1.64228E-04 | 7.53234E-05 |
| $a_{16}$ | 1.16519E-01 | -8.26829E-04 | 7.30398E-06 | -2.92421E-06 |

FIG. 5

| f(Focus)=3.721mm, HFOV(Half angular field of view)= 36.776 deg., System length= 4.535mm, Fno= 2.446, Image Heigh=2.856mm | | | | | | | |
|---|---|---|---|---|---|---|---|
| Surface # | | Radius | Thickness | Refractive index | Abbe number | Material | Focus |
| - | Object | ∞ | ∞ | | | | |
| 200 | Aperture stop | ∞ | -0.210 | | | | |
| 211 | 1st lens element | 1.403 | 0.614 | 1.544 | 56.114 | plastic | 2.260 |
| 212 | | -8.649 | 0.094 | | | | |
| 221 | 2nd lens element | -3.305 | 0.248 | 1.636 | 23.972 | plastic | -4.171 |
| 222 | | 14.314 | 0.650 | | | | |
| 231 | 3rd lens element | -1.601 | 0.788 | 1.535 | 55.635 | plastic | 2.205 |
| 232 | | -0.797 | 0.246 | | | | |
| 241 | 4th lens element | -8.052 | 0.487 | 1.535 | 55.635 | plastic | -2.066 |
| 242 | | 1.312 | 0.400 | | | | |
| 251 | IR cut filter | ∞ | 0.300 | | | | |
| 252 | | ∞ | 0.709 | | | | |
| 260 | Image plane | ∞ | | | | | |

FIG. 8

| Aspherical parameters | | | | |
|---|---|---|---|---|
| Surface # | 211 | 212 | 221 | 222 |
| K | -1.21626E+00 | 9.10302E+01 | -5.38631E+01 | -2.04899E+02 |
| $a_4$ | 8.20701E-04 | 1.09047E-01 | 2.23769E-01 | 4.24374E-01 |
| $a_6$ | 2.89564E-01 | -2.45676E-01 | -2.94744E-01 | -5.71739E-01 |
| $a_8$ | -8.74622E-01 | 1.32425E-01 | -3.65836E-01 | 8.41791E-01 |
| $a_{10}$ | 8.16821E-01 | -1.27360E+00 | 1.05222E+00 | -3.96100E-01 |
| $a_{12}$ | 9.97050E-01 | 2.53784E+00 | -2.58572E+00 | -1.74558E+00 |
| $a_{14}$ | -2.85373E+00 | -1.69116E+00 | 4.46951E+00 | 3.83349E+00 |
| $a_{16}$ | 1.51279E+00 | 2.46207E-01 | -2.63212E+00 | -2.19594E+00 |
| Surface # | 231 | 232 | 241 | 242 |
| K | 1.71463E+00 | -2.60415E+00 | 9.46692E+00 | -9.85315E+00 |
| $a_4$ | -1.14439E-02 | -1.41771E-01 | -1.83647E-02 | -8.15523E-02 |
| $a_6$ | 2.75789E-02 | 2.19410E-02 | -2.86330E-03 | 4.10515E-02 |
| $a_8$ | 1.32650E-01 | 4.99473E-02 | 1.42222E-02 | -1.71030E-02 |
| $a_{10}$ | -4.11882E-01 | -1.00520E-01 | -6.77515E-03 | 4.74504E-03 |
| $a_{12}$ | 6.30844E-01 | 8.18294E-02 | 1.49448E-03 | -8.07096E-04 |
| $a_{14}$ | -3.99021E-01 | -2.03124E-02 | -1.64225E-04 | 7.52931E-05 |
| $a_{16}$ | 1.18570E-01 | -8.31588E-04 | 7.30466E-06 | -2.93070E-06 |

FIG. 9

| f(Focus)=3.671mm, HFOV(Half angular field of view)= 37.052 deg., System length= 4.566mm, Fno= 2.436, Image Height=2.856mm | | | | | | | |
|---|---|---|---|---|---|---|---|
| Surface # | | Radius | Thickness | Refractive index | Abbe number | Material | Focus |
| - | Object | ∞ | | | | | |
| 300 | Aperture stop | ∞ | -0.210 | | | | |
| 311 | 1st lens element | 1.388 | 0.598 | 1.544 | 56.114 | plastic | 2.237 |
| 312 | | -8.588 | 0.077 | | | | |
| 321 | 2nd lens element | -4.101 | 0.248 | 1.636 | 23.972 | plastic | -4.325 |
| 322 | | 8.731 | 0.636 | | | | |
| 331 | 3rd lens element | -1.693 | 0.920 | 1.535 | 55.635 | plastic | 1.972 |
| 332 | | -0.774 | 0.145 | | | | |
| 341 | 4th lens element | -7.949 | 0.544 | 1.535 | 55.635 | plastic | -1.882 |
| 342 | | 1.184 | 0.400 | | | | |
| 351 | IR cut filter | ∞ | 0.300 | | | | |
| 352 | | ∞ | 0.698 | | | | |
| 360 | Image plane | ∞ | | | | | |

FIG. 12

| Aspherical parameters | | | | |
|---|---|---|---|---|
| Surface # | 311 | 312 | 321 | 322 |
| K | -1.13289E+00 | 9.31340E+01 | -6.10842E+01 | -2.72106E+02 |
| $a_4$ | -1.13517E-03 | 1.03337E-01 | 2.42629E-01 | 4.31359E-01 |
| $a_6$ | 2.79174E-01 | -2.54212E-01 | -2.84845E-01 | -5.52186E-01 |
| $a_8$ | -8.82521E-01 | 1.31437E-01 | -3.66691E-01 | 8.59405E-01 |
| $a_{10}$ | 8.16032E-01 | -1.27112E+00 | 1.04572E+00 | -3.91299E-01 |
| $a_{12}$ | 9.99610E-01 | 2.53992E+00 | -2.59316E+00 | -1.75649E+00 |
| $a_{14}$ | -2.86326E+00 | -1.69441E+00 | 4.46422E+00 | 3.81438E+00 |
| $a_{16}$ | 1.45548E+00 | 2.30477E-01 | -2.62971E+00 | -2.20830E+00 |
| Surface # | 331 | 332 | 341 | 342 |
| K | 2.11478E+00 | -2.74538E+00 | 9.36745E+00 | -8.98722E+00 |
| $a_4$ | -3.53065E-02 | -1.44809E-01 | -1.71109E-02 | -7.95192E-02 |
| $a_6$ | 1.64931E-02 | 2.94343E-02 | -2.66670E-03 | 4.08298E-02 |
| $a_8$ | 1.29398E-01 | 4.94075E-02 | 1.42166E-02 | -1.71226E-02 |
| $a_{10}$ | -4.01298E-01 | -1.03698E-01 | -6.77729E-03 | 4.75007E-03 |
| $a_{12}$ | 6.45759E-01 | 8.05725E-02 | 1.49437E-03 | -8.06295E-04 |
| $a_{14}$ | -3.91596E-01 | -2.00113E-02 | -1.64211E-04 | 7.53114E-05 |
| $a_{16}$ | 1.11330E-01 | -4.68085E-05 | 7.30646E-06 | -2.94559E-06 |

FIG. 13

| f(Focus)= 3.844 mm, HFOV(Half angular field of view)= 36.429 deg., System length= 4.564mm, Fno= 2.410, Image Heigh=2.856mm ||||||||
|---|---|---|---|---|---|---|---|
| Surface # | | Radius | Thickness | Refractive index | Abbe number | Material | Focus |
| -- | Object | ∞ | | | | | |
| 400 | Aperture stop | ∞ | -0.210 | | | | |
| 411 | 1st lens element | 1.391 | 0.645 | 1.544 | 56.114 | plastic | 2.274 |
| 412 | | -9.654 | 0.080 | | | | |
| 421 | 2nd lens element | -3.863 | 0.230 | 1.636 | 23.972 | plastic | -4.041 |
| 422 | | 8.013 | 0.661 | | | | |
| 431 | 3rd lens element | -1.779 | 0.777 | 1.535 | 55.635 | plastic | 2.313 |
| 432 | | -0.842 | 0.178 | | | | |
| 441 | 4th lens element | -8.659 | 0.546 | 1.535 | 55.635 | plastic | -2.181 |
| 442 | | 1.382 | 0.400 | | | | |
| 451 | IR cut filter | ∞ | 0.300 | | | | |
| 452 | | ∞ | 0.747 | | | | |
| 460 | Image plane | ∞ | | | | | |

FIG. 16

| Aspherical parameters | | | | |
|---|---|---|---|---|
| Surface # | 411 | 412 | 421 | 422 |
| K | -1.19566E+00 | 8.28767E+01 | -7.97542E+01 | -1.27714E+02 |
| $a_4$ | 3.67181E-03 | 1.15205E-01 | 2.30993E-01 | 4.11247E-01 |
| $a_6$ | 3.12216E-01 | -1.51282E-01 | -2.60847E-01 | -5.70948E-01 |
| $a_8$ | -8.82930E-01 | 1.15646E-01 | -2.92696E-01 | 8.66007E-01 |
| $a_{10}$ | 8.17203E-01 | -1.32787E+00 | 1.06036E+00 | -3.76432E-01 |
| $a_{12}$ | 1.04466E+00 | 2.54518E+00 | -2.71710E+00 | -1.76195E+00 |
| $a_{14}$ | -2.77806E+00 | -1.64307E+00 | 4.30455E+00 | 3.78889E+00 |
| $a_{16}$ | 1.50905E+00 | 1.82339E-01 | -2.45960E+00 | -2.15159E+00 |
| Surface # | 431 | 432 | 441 | 442 |
| K | 2.17866E+00 | -2.54855E+00 | 1.03901E+00 | -1.02531E+01 |
| $a_4$ | 6.68003E-03 | -7.84835E-02 | -1.67454E-02 | -8.26445E-02 |
| $a_6$ | -7.39023E-02 | -3.22000E-02 | -2.74282E-03 | 4.10446E-02 |
| $a_8$ | 2.81712E-01 | 7.94261E-02 | 1.41291E-02 | -1.71447E-02 |
| $a_{10}$ | -5.07416E-01 | -9.47993E-02 | -6.77684E-03 | 4.74586E-03 |
| $a_{12}$ | 5.71835E-01 | 7.34528E-02 | 1.49610E-03 | -8.03341E-04 |
| $a_{14}$ | -3.15725E-01 | -2.36888E-02 | -1.64085E-04 | 7.55543E-05 |
| $a_{16}$ | 7.22699E-02 | 1.65230E-03 | 7.22210E-06 | -3.03527E-06 |

FIG. 17

| f(Focus)=3.767mm, HFOV(Half angular field of view)= 36.521 deg., System length= 4.560mm, Fno= 2.438, Image Heigh=2.856mm |||||||| 
|---|---|---|---|---|---|---|---|
| Surface # | | Radius | Thickness | Refractive index | Abbe number | Material | Focus |
| - | Object | ∞ | ∞ | | | | |
| 500 | Aperture stop | ∞ | -0.210 | | | | |
| 511 | 1st lens element | 1.398 | 0.623 | 1.544 | 56.114 | plastic | 2.254 |
| 512 | | -8.672 | 0.083 | | | | |
| 521 | 2nd lens element | -3.694 | 0.246 | 1.636 | 23.972 | plastic | -4.140 |
| 522 | | 9.627 | 0.663 | | | | |
| 531 | 3rd lens element | -1.618 | 0.762 | 1.535 | 55.635 | plastic | 2.160 |
| 532 | | -0.786 | 0.148 | | | | |
| 541 | 4th lens element | -8.099 | 0.576 | 1.535 | 55.635 | plastic | -2.034 |
| 542 | | 1.292 | 0.400 | | | | |
| 551 | IR cut filter | ∞ | 0.300 | | | | |
| 552 | | ∞ | 0.758 | | | | |
| 560 | Image plane | ∞ | | | | | |

FIG. 20

| Aspherical parameters | | | | |
|---|---|---|---|---|
| Surface # | 511 | 512 | 521 | 522 |
| K | -1.20275E+00 | 9.05241E+01 | -6.28219E+01 | -2.70865E+02 |
| $a_4$ | 1.21413E-03 | 1.10090E-01 | 2.26414E-01 | 4.25434E-01 |
| $a_6$ | 2.87791E-01 | -2.46526E-01 | -2.92712E-01 | -5.69200E-01 |
| $a_8$ | -8.74901E-01 | 1.32063E-01 | -3.65046E-01 | 8.43625E-01 |
| $a_{10}$ | 8.20010E-01 | -1.27219E+00 | 1.05179E+00 | -3.96243E-01 |
| $a_{12}$ | 1.00400E+00 | 2.54159E+00 | -2.58559E+00 | -1.74680E+00 |
| $a_{14}$ | -2.84664E+00 | -1.68503E+00 | 4.47429E+00 | 3.83587E+00 |
| $a_{16}$ | 1.50709E+00 | 2.53938E-01 | -2.61760E+00 | -2.17856E+00 |
| Surface # | 531 | 532 | 541 | 542 |
| K | 1.75950E+00 | -2.64768E+00 | 9.45656E+00 | -1.00627E+01 |
| $a_4$ | -1.82348E-02 | -1.40807E-01 | -1.83933E-02 | -8.23394E-02 |
| $a_6$ | 2.89060E-02 | 2.40503E-02 | -2.88383E-03 | 4.07852E-02 |
| $a_8$ | 1.31770E-01 | 5.08650E-02 | 1.42209E-02 | -1.71076E-02 |
| $a_{10}$ | -4.13712E-01 | -1.00266E-01 | -6.77518E-03 | 4.74636E-03 |
| $a_{12}$ | 6.29405E-01 | 8.19219E-02 | 1.49447E-03 | -8.06927E-04 |
| $a_{14}$ | -4.00375E-01 | -2.02785E-02 | -1.64233E-04 | 7.53040E-05 |
| $a_{16}$ | 1.15467E-01 | -8.34579E-04 | 7.30145E-06 | -2.93075E-06 |

FIG. 21

| f(Focus)= 3.673mm, HFOV(Half angular field of view)= 37.110 deg., System length= 4.512mm, Fno= 2.456, Image Heigh=2.856mm |||||||
|---|---|---|---|---|---|---|
| Surface # | | Radius | Thickness | Refractive index | Abbe number | Material | Focus |
| - | Object | ∞ | ∞ | | | | |
| 600 | Aperture stop | ∞ | -0.200 | | | | |
| 611 | 1st lens element | 1.449 | 0.558 | 1.544 | 56.114 | plastic | 2.322 |
| 612 | | -8.745 | 0.097 | | | | |
| 621 | 2nd lens element | -5.132 | 0.372 | 1.636 | 23.972 | plastic | -4.145 |
| 622 | | 5.651 | 0.554 | | | | |
| 631 | 3rd lens element | -1.718 | 0.741 | 1.535 | 55.635 | plastic | 2.493 |
| 632 | | -0.865 | 0.330 | | | | |
| 641 | 4th lens element | -7.987 | 0.535 | 1.535 | 55.635 | plastic | -2.294 |
| 642 | | 1.488 | 0.400 | | | | |
| 651 | IR cut filter | ∞ | 0.300 | | | | |
| 652 | | ∞ | 0.626 | | | | |
| 660 | Image plane | ∞ | | | | | |

FIG. 24

| Aspherical parameters | | | | |
|---|---|---|---|---|
| Surface # | 611 | 612 | 621 | 622 |
| K | -1.12580E+00 | 9.18423E+01 | -1.75245E+01 | -1.29006E+02 |
| $a_4$ | 3.55600E-03 | 1.23188E-01 | 2.16587E-01 | 3.65720E-01 |
| $a_6$ | 2.79568E-01 | -2.31583E-01 | -2.96163E-01 | -5.54882E-01 |
| $a_8$ | -8.74779E-01 | 1.10277E-01 | -3.76748E-01 | 8.83638E-01 |
| $a_{10}$ | 8.27936E-01 | -1.31583E+00 | 1.00306E+00 | -4.21531E-01 |
| $a_{12}$ | 1.02135E+00 | 2.51667E+00 | -2.65493E+00 | -1.87262E+00 |
| $a_{14}$ | -2.84492E+00 | -1.69531E+00 | 4.45233E+00 | 3.72536E+00 |
| $a_{16}$ | 1.35629E+00 | 2.29618E-01 | -2.48321E+00 | -1.96061E+00 |
| Surface # | 631 | 632 | 641 | 642 |
| K | 1.92376E+00 | -2.57157E+00 | 8.93086E+00 | -8.88359E+00 |
| $a_4$ | 1.61781E-02 | -1.33496E-01 | -2.25808E-02 | -8.60010E-02 |
| $a_6$ | 6.56610E-02 | 3.44504E-02 | -2.24548E-03 | 4.15994E-02 |
| $a_8$ | 1.10227E-01 | 5.70441E-02 | 1.42566E-02 | -1.71241E-02 |
| $a_{10}$ | -4.23225E-01 | -1.01877E-01 | -6.77696E-03 | 4.74131E-03 |
| $a_{12}$ | 6.37364E-01 | 7.85125E-02 | 1.49398E-03 | -8.06549E-04 |
| $a_{14}$ | -4.04147E-01 | -2.15772E-02 | -1.64270E-04 | 7.54147E-05 |
| $a_{16}$ | 8.99800E-02 | -5.45923E-05 | 7.30664E-06 | -2.93187E-06 |

FIG. 25

| f(Focus)=3.712mm, HFOV(Half angular field of view)= 36.724 deg., System length= 4.552mm, Fno= 2.458, Image Heigh=2.856mm |||||||||
|---|---|---|---|---|---|---|---|
| Surface # | | Radius | Thickness | Refractive index | Abbe number | Material | Focus |
| - | Object | ∞ | ∞ | | | | |
| 700 | Aperture stop | ∞ | -0.200 | | | | |
| 711 | 1st lens element | 1.442 | 0.572 | 1.544 | 56.114 | plastic | 2.313 |
| 712 | | -8.735 | 0.082 | | | | |
| 721 | 2nd lens element | -5.208 | 0.336 | 1.636 | 23.972 | plastic | -4.072 |
| 722 | | 5.352 | 0.628 | | | | |
| 731 | 3rd lens element | -1.755 | 0.751 | 1.535 | 55.635 | plastic | 2.244 |
| 732 | | -0.821 | 0.250 | | | | |
| 741 | 4th lens element | -8.005 | 0.504 | 1.535 | 55.635 | plastic | -2.138 |
| 742 | | 1.367 | 0.400 | | | | |
| 751 | IR cut filter | ∞ | 0.300 | | | | |
| 752 | | ∞ | 0.729 | | | | |
| 760 | Image plane | ∞ | | | | | |

FIG. 28

| Aspherical parameters | | | | |
|---|---|---|---|---|
| Surface # | 711 | 712 | 721 | 722 |
| K | -1.14691E+00 | 9.22173E+01 | -2.45874E+01 | -1.19433E+02 |
| $a_4$ | 2.75201E-03 | 1.25302E-01 | 2.20738E-01 | 3.68145E-01 |
| $a_6$ | 2.79145E-01 | -2.34921E-01 | -2.88073E-01 | -5.51568E-01 |
| $a_8$ | -8.73837E-01 | 1.09986E-01 | -3.71981E-01 | 8.86246E-01 |
| $a_{10}$ | 8.31122E-01 | -1.30967E+00 | 1.00445E+00 | -4.18943E-01 |
| $a_{12}$ | 1.02733E+00 | 2.52815E+00 | -2.65420E+00 | -1.86858E+00 |
| $a_{14}$ | -2.83455E+00 | -1.68149E+00 | 4.45476E+00 | 3.72862E+00 |
| $a_{16}$ | 1.37530E+00 | 2.44313E-01 | -2.47851E+00 | -1.96221E+00 |
| Surface # | 731 | 732 | 741 | 742 |
| K | 2.07859E+00 | -2.66237E+00 | 9.12522E+00 | -9.28028E+00 |
| $a_4$ | -1.07794E-02 | -1.42998E-01 | -2.21101E-02 | -8.54678E-02 |
| $a_6$ | 5.81346E-02 | 3.19020E-02 | -2.20930E-03 | 4.15706E-02 |
| $a_8$ | 1.08086E-01 | 5.60505E-02 | 1.42624E-02 | -1.71379E-02 |
| $a_{10}$ | -4.24391E-01 | -1.02521E-01 | -6.77586E-03 | 4.74121E-03 |
| $a_{12}$ | 6.37048E-01 | 7.84256E-02 | 1.49416E-03 | -8.06338E-04 |
| $a_{14}$ | -4.01862E-01 | -2.13296E-02 | -1.64248E-04 | 7.54625E-05 |
| $a_{16}$ | 9.50136E-02 | 2.72682E-04 | 7.30734E-06 | -2.92343E-06 |

FIG. 29

| \multicolumn{8}{c}{f(Focus)=3.724mm, HFOV(Half angular field of view)= 36.952 deg., System length= 4.556mm, Fno= 2.429, Image Heigh=2.856mm} |||||||| 
|---|---|---|---|---|---|---|---|
| Surface # | | Radius | Thickness | Refractive index | Abbe number | Material | Focus |
| - | Object | ∞ | ∞ | | | | |
| 800 | Aperture stop | ∞ | -0.200 | | | | |
| 811 | 1st lens element | 1.415 | 0.621 | 1.544 | 56.114 | plastic | 2.283 |
| 812 | | -8.840 | 0.078 | | | | |
| 821 | 2nd lens element | -3.562 | 0.245 | 1.636 | 23.972 | plastic | -4.397 |
| 822 | | 13.785 | 0.587 | | | | |
| 831 | 3rd lens element | -1.724 | 0.888 | 1.535 | 55.635 | plastic | 2.404 |
| 832 | | -0.870 | 0.340 | | | | |
| 841 | 4th lens element | -7.326 | 0.431 | 1.535 | 55.635 | plastic | -2.209 |
| 842 | | 1.442 | 0.400 | | | | |
| 851 | IR cut filter | ∞ | 0.300 | | | | |
| 852 | | ∞ | 0.664 | | | | |
| 860 | Image plane | ∞ | | | | | |

FIG. 32

| Aspherical parameters | | | | |
|---|---|---|---|---|
| Surface # | 811 | 812 | 821 | 822 |
| K | -1.08407E+00 | 9.42658E+01 | -4.91775E+01 | -8.69686E+00 |
| $a_4$ | 4.93693E-03 | 1.01199E-01 | 2.20069E-01 | 3.82243E-01 |
| $a_6$ | 2.71304E-01 | -2.41294E-01 | -2.95539E-01 | -5.46423E-01 |
| $a_8$ | -8.70201E-01 | 1.10228E-01 | -3.66606E-01 | 8.94015E-01 |
| $a_{10}$ | 8.33649E-01 | -1.30232E+00 | 1.01636E+00 | -4.04615E-01 |
| $a_{12}$ | 1.02435E+00 | 2.54371E+00 | -2.64175E+00 | -1.85685E+00 |
| $a_{14}$ | -2.83278E+00 | -1.65854E+00 | 4.46501E+00 | 3.73045E+00 |
| $a_{16}$ | 1.41329E+00 | 2.69146E-01 | -2.46766E+00 | -1.96895E+00 |
| Surface # | 831 | 832 | 841 | 842 |
| K | 1.99651E+00 | -2.66964E+00 | 7.66635E+00 | -8.78929E+00 |
| $a_4$ | -1.59159E-02 | -1.32487E-01 | -2.68438E-02 | -8.56347E-02 |
| $a_6$ | 3.07886E-02 | 2.74901E-02 | -1.24764E-03 | 4.20490E-02 |
| $a_8$ | 1.12653E-01 | 5.50956E-02 | 1.43080E-02 | -1.71906E-02 |
| $a_{10}$ | -4.03100E-01 | -1.02114E-01 | -6.78337E-03 | 4.73209E-03 |
| $a_{12}$ | 6.56598E-01 | 7.86640E-02 | 1.49261E-03 | -8.06054E-04 |
| $a_{14}$ | -3.97762E-01 | -2.10534E-02 | -1.64297E-04 | 7.56117E-05 |
| $a_{16}$ | 7.99277E-02 | 6.49580E-04 | 7.35796E-06 | -2.918800E-06 |

FIG. 33

| Surface # | | Radius | Thickness | Refractive index | Abbe number | Material | Focus |
|---|---|---|---|---|---|---|---|
| | f(Focus)=3.701mm, HFOV(Half angular field of view)= 37.086 deg., System length= 4.553mm, Fno= 2.450, Image Heigh=2.856mm |||||||
| - | Object | ∞ | ∞ | | | | |
| 900 | Aperture stop | ∞ | -0.200 | | | | |
| 911 | 1st lens element | 1.445 | 0.565 | 1.544 | 56.114 | plastic | 2.343 |
| 912 | | -9.627 | 0.079 | | | | |
| 921 | 2nd lens element | -4.828 | 0.263 | 1.636 | 23.972 | plastic | -3.975 |
| 922 | | 5.496 | 0.645 | | | | |
| 931 | 3rd lens element | -1.607 | 0.669 | 1.535 | 55.635 | plastic | 2.268 |
| 932 | | -0.793 | 0.124 | | | | |
| 941 | 4th lens element | 10.486 | 0.498 | 1.535 | 55.635 | plastic | -2.431 |
| 942 | | 1.140 | 0.400 | | | | |
| 951 | IR cut filter | ∞ | 0.300 | | | | |
| 952 | | ∞ | 1.010 | | | | |
| 960 | Image plane | ∞ | | | | | |

FIG. 36

| Aspherical parameters | | | | |
|---|---|---|---|---|
| Surface # | 911 | 912 | 921 | 922 |
| K | -1.08737E+00 | 8.90482E+01 | -7.03425E+01 | -5.85167E+01 |
| $a_4$ | 6.25487E-03 | 1.19152E-01 | 2.24222E-01 | 3.73021E-01 |
| $a_6$ | 2.75483E-01 | -2.33442E-01 | -3.01526E-01 | -5.60800E-01 |
| $a_8$ | -8.84926E-01 | 1.14168E-01 | -3.61943E-01 | 8.79349E-01 |
| $a_{10}$ | 8.47180E-01 | -1.30174E+00 | 1.03117E+00 | -4.15451E-01 |
| $a_{12}$ | 1.02154E+00 | 2.53954E+00 | -2.62801E+00 | -1.84996E+00 |
| $a_{14}$ | -2.82486E+00 | -1.69403E+00 | 4.45645E+00 | 3.75662E+00 |
| $a_{16}$ | 1.40366E+00 | 2.07557E-01 | -2.51097E+00 | -1.99988E+00 |
| Surface # | 931 | 932 | 941 | 942 |
| K | 1.78808E+00 | -2.63075E+00 | -1.30677E+03 | -8.68682E+00 |
| $a_4$ | -8.73961E-03 | -1.39390E-01 | -3.31109E-02 | -8.79018E-02 |
| $a_6$ | 9.54430E-02 | 3.00205E-02 | -2.35023E-03 | 4.19607E-02 |
| $a_8$ | 1.54736E-01 | 6.85694E-02 | 1.42635E-02 | -1.70912E-02 |
| $a_{10}$ | -3.84272E-01 | -9.99123E-02 | -6.77230E-03 | 4.73614E-03 |
| $a_{12}$ | 5.22129E-01 | 7.75431E-02 | 1.49545E-03 | -8.07125E-04 |
| $a_{14}$ | -4.26191E-01 | -2.28794E-02 | -1.64110E-04 | 7.56161E-05 |
| $a_{16}$ | 2.01980E-01 | -7.40724E-04 | 7.24164E-06 | -2.88722E-06 |

FIG. 37

| f(Focus)=3.718mm, HFOV(Half angular field of view)= 37.047 deg., System length= 4.555mm, Fno= 2.438, Image Heigh=2.856mm ||||||||
|---|---|---|---|---|---|---|---|
| Surface # | | Radius | Thickness | Refractive index | Abbe number | Material | Focus |
| - | Object | ∞ | ∞ | | | | |
| 1000 | Aperture stop | ∞ | -0.200 | | | | |
| 1011 | 1st lens element | 1.417 | 0.611 | 1.544 | 56.114 | plastic | 2.373 |
| 1012 | | -12.815 | 0.098 | | | | |
| 1021 | 2nd lens element | -2.596 | 0.246 | 1.636 | 23.972 | plastic | -4.534 |
| 1022 | | -25.466 | 0.620 | | | | |
| 1031 | 3rd lens element | -1.545 | 0.712 | 1.535 | 55.635 | plastic | 2.182 |
| 1032 | | -0.773 | 0.154 | | | | |
| 1041 | 4th lens element | 21.430 | 0.439 | 1.535 | 55.635 | plastic | -2.243 |
| 1042 | | 1.131 | 0.400 | | | | |
| 1051 | IR cut filter | ∞ | 0.300 | | | | |
| 1052 | | ∞ | 0.976 | | | | |
| 1060 | Image plane | ∞ | | | | | |

FIG. 40

| Aspherical parameters | | | | |
|---|---|---|---|---|
| Surface # | 1011 | 1012 | 1021 | 1022 |
| K | -9.87513E-01 | 1.22450E+02 | -2.45148E+01 | 8.07409E+02 |
| $a_4$ | 8.26140E-03 | 9.37922E-02 | 2.01648E-01 | 3.97491E-01 |
| $a_6$ | 2.80066E-01 | -2.32631E-01 | -2.92835E-01 | -5.56663E-01 |
| $a_8$ | -8.39757E-01 | 1.10839E-01 | -3.36873E-01 | 8.70947E-01 |
| $a_{10}$ | 7.86767E-01 | -1.30857E+00 | 9.90410E-01 | -3.88628E-01 |
| $a_{12}$ | 1.06069E+00 | 2.50963E+00 | -2.62625E+00 | -1.84814E+00 |
| $a_{14}$ | -2.80236E+00 | -1.65975E+00 | 4.48012E+00 | 3.68752E+00 |
| $a_{16}$ | 1.42488E+00 | 2.77214E-01 | -2.46261E+00 | -1.85492E+00 |
| Surface # | 1031 | 1032 | 1041 | 1042 |
| K | 1.64048E+00 | -2.66690E+00 | -5.09224E+03 | -8.87844E+00 |
| $a_4$ | -1.92482E-02 | -1.38012E-01 | -3.64344E-02 | -8.71991E-02 |
| $a_6$ | 8.99353E-02 | 2.29487E-02 | -1.58291E-03 | 4.19026E-02 |
| $a_8$ | 1.31435E-01 | 5.75374E-02 | 1.43255E-02 | -1.70610E-02 |
| $a_{10}$ | -4.06191E-01 | -9.20772E-02 | -6.82366E-03 | 4.71655E-03 |
| $a_{12}$ | 5.43761E-01 | 7.24760E-02 | 1.49732E-03 | -8.03608E-04 |
| $a_{14}$ | -4.15292E-01 | -2.01995E-02 | -1.62628E-04 | 7.46849E-05 |
| $a_{16}$ | 2.01896E-01 | 3.42617E-04 | 7.08300E-06 | -2.78951E-06 |

FIG. 41

| Embodiment | 1st Embodiment | 2nd Embodiment | 3rd Embodiment | 4th Embodiment | 5th Embodiment |
| --- | --- | --- | --- | --- | --- |
| ALT | 2.241 | 2.137 | 2.310 | 2.198 | 2.207 |
| AAG | 0.851 | 0.990 | 0.858 | 0.919 | 0.894 |
| TL | 3.092 | 3.127 | 3.168 | 3.117 | 3.101 |
| EFL | 3.760 | 3.721 | 3.672 | 3.845 | 3.767 |
| EFL/(AC12+AC34) | 18.990 | 10.944 | 16.541 | 14.903 | 16.307 |
| CT2/(AC12+AC34) | 1.242 | 0.729 | 1.117 | 0.891 | 1.065 |
| TL/CT4 | 5.145 | 6.421 | 5.824 | 5.709 | 5.384 |
| TL/AC23 | 4.735 | 4.811 | 4.981 | 4.716 | 4.677 |
| EFL/CT3 | 4.928 | 4.722 | 3.991 | 4.949 | 4.944 |
| ALT/(AC12+AC34) | 11.318 | 6.285 | 10.405 | 8.519 | 9.554 |
| (AC23+CT3)/CT2 | 5.756 | 5.798 | 6.274 | 6.252 | 5.793 |
| CT4/CT2 | 2.443 | 1.964 | 2.194 | 2.374 | 2.341 |
| AAG/CT2 | 3.459 | 3.992 | 3.460 | 3.996 | 3.634 |
| CT3/CT2 | 3.102 | 3.177 | 3.710 | 3.378 | 3.098 |
| (AAG+CT3)/CT2 | 6.561 | 7.169 | 7.169 | 7.374 | 6.732 |

| Embodiment | 6th Embodiment | 7th Embodiment | 8th Embodiment | 9th Embodiment | 10th Embodiment |
| --- | --- | --- | --- | --- | --- |
| ALT | 2.206 | 2.163 | 2.185 | 1.995 | 2.008 |
| AAG | 0.981 | 0.960 | 1.005 | 0.848 | 0.872 |
| TL | 3.187 | 3.123 | 3.190 | 2.843 | 2.880 |
| EFL | 3.673 | 3.712 | 3.724 | 3.701 | 3.718 |
| EFL/(AC12+AC34) | 8.602 | 11.181 | 8.909 | 18.232 | 14.754 |
| CT2/(AC12+AC34) | 0.871 | 1.012 | 0.586 | 1.296 | 0.976 |
| TL/CT4 | 5.957 | 6.196 | 7.401 | 5.709 | 6.560 |
| TL/AC23 | 5.753 | 4.973 | 5.434 | 4.408 | 4.645 |
| EFL/CT3 | 4.957 | 4.943 | 4.194 | 5.532 | 5.222 |
| ALT/(AC12+AC34) | 5.166 | 6.515 | 5.227 | 9.828 | 7.968 |
| (AC23+CT3)/CT2 | 3.481 | 4.104 | 6.020 | 4.996 | 5.415 |
| CT4/CT2 | 1.438 | 1.500 | 1.759 | 1.894 | 1.785 |
| AAG/CT2 | 2.637 | 2.857 | 4.102 | 3.224 | 3.545 |
| CT3/CT2 | 1.992 | 2.235 | 3.624 | 2.544 | 2.894 |
| (AAG+CT3)/CT2 | 4.629 | 5.092 | 7.727 | 5.768 | 6.439 |

FIG. 42

MOBIL DEVICE AND OPTICAL IMAGING LENS HAVING FOUR LENS ELEMENTS THEREOF

TECHNICAL FIELD

The present invention relates to a mobile device and an optical imaging lens thereof, and particularly, relates to a mobile device applying an optical imaging lens having four lens elements and an optical imaging lens thereof.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The length of conventional optical imaging lenses comprising four lens elements can be limited in a certain range; however, as the more and more demands in the market for high-end products, high-standard optical imaging lenses which show great quality with more pixels are required. U.S. Pat. Nos. 7,920,340, 7,660,049 and 7,848,032 all disclosed an optical imaging lens constructed with an optical imaging lens having four lens elements. The length of the optical imaging lens, which, from the object-side surface of the first lens element to the image plane, are greater than 7 mm. Therefore, there is needed to develop optical imaging lens which is capable to place with four lens elements therein, with a shorter length, while also having good optical characters.

SUMMARY

An object of the present invention is to provide a mobile device and an optical imaging lens thereof. With controlling the convex or concave shape of the surfaces and an inequality, the length of the optical imaging lens is shortened and meanwhile the good optical characters, and system functionality are sustained.

In an exemplary embodiment, an optical imaging lens comprises, sequentially from an object side to an image side along an optical axis, comprises first, second, third and fourth lens elements, each of the first, second, third and fourth lens elements having refracting power, an object-side surface facing toward the object side, an image-side surface facing toward the image side and a central thickness defined along the optical axis, wherein: the first lens element has positive refracting power, the object-side surface thereof comprises a convex portion in a vicinity of the optical axis, and the image-side surface thereof comprises a convex portion in a vicinity of the optical axis; the second lens element has negative refracting power, the object-side surface thereof comprises a concave portion in a vicinity of a periphery of the second lens element, and the image-side surface thereof comprises a concave portion in a vicinity of a periphery of the second lens element; the object-side surface of the third lens element is a concave surface, and the image-side surface thereof comprises a convex portion in a vicinity of the optical axis; and the fourth lens element is constructed by plastic material, and the object-side surface thereof comprises a convex portion in a vicinity of a periphery of the fourth lens element. The optical imaging lens comprises no other lenses having reflecting power beyond the four lens elements.

In another exemplary embodiment, other equation(s), such as those relating to the ratio among parameters could be taken into consideration. For example, an air gap between the first lens element and the second lens element along the optical axis, $AC12$, an air gap between the third lens element and the fourth lens element along the optical axis, $AC34$, and an effective focal length of the optical imaging lens, $EFL$, could be controlled to satisfy the equation as follows:

$$EFL/(AC12+AC34) \leq 20.00 \qquad \text{Equation (1); or}$$

$AC12$, $AC34$, and the central thickness of the second lens element along the optical axis, $CT2$, could be controlled to satisfy the equation as follows:

$$CT2/(AC12+AC34) \leq 1.45 \qquad \text{Equation (2); or}$$

The central thickness of the fourth lens element along the optical axis, $CT4$, and the distance between the object-side surface of the first lens element and the image-side surface of the fourth lens element, $TL$, could be controlled to satisfy the equation as follows:

$$TL/CT4 \leq 7.00 \qquad \text{Equation (3); or}$$

$TL$ and an air gap between the second lens element and the third lens element along the optical axis, $AC23$, could be controlled to satisfy the equation as follows:

$$TL/AC23 \leq 5.80 \qquad \text{Equation (4); or}$$

$EFL$ and the central thickness of the third lens element along the optical axis, $CT3$, could be controlled to satisfy the equation as follows:

$$EFL/CT3 \leq 5.90 \qquad \text{Equation (5); or}$$

$AC12$, $AC34$ and the sum of the thickness of all four lens elements along the optical axis, $ALT$, could be controlled to satisfy the equation as follows:

$$ALT/(AC12+AC34) \leq 9.90 \qquad \text{Equation (6); or}$$

$CT2$, $CT3$ and $AC23$ could be controlled to satisfy the equation as follows:

$$3.40 \leq (AC23+CT3)/CT2 \qquad \text{Equation (7); or}$$

$$3.80 \leq (AC23+CT3)/CT2 \qquad \text{Equation (7'); or}$$

$CT2$ and $CT4$ could be controlled to satisfy the equation as follows:

$$1.40 \leq CT4/CT2 \qquad \text{Equation (8); or}$$

$CT2$ and the sum of all three air gaps from the first lens element to the fourth lens element along the optical axis, $AAG$, could be controlled to satisfy the equation as follows:

$$2.55 \leq AAG/CT2 \qquad \text{Equation (9); or}$$

$CT2$ and $CT3$ could be controlled to satisfy the equation as follows:

$$1.90 \leq CT3/CT2 \qquad \text{Equation (10); or}$$

$CT2$, $CT3$ and $AAG$ could be controlled to satisfy the equation as follows:

$$4.80 \leq (AAG+CT3)/CT2 \qquad \text{Equation (11).}$$

Aforesaid exemplary embodiments are not limited and could be selectively incorporated in other embodiments described herein.

In some exemplary embodiments, more details about the convex or concave surface structure, refracting power and/or the position of an aperture stop could be incorporated for one specific lens element or broadly for plural lens elements to enhance the control for the system performance and/or resolution. It is noted that the details listed here could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and/or the refraction power of the lens element(s), the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 28 is a table of optical data for each lens element of the optical imaging lens of a seventh embodiment of the present disclosure;

FIG. 29 is a table of aspherical data of a seventh embodiment of the optical imaging lens according to the present disclosure;

FIG. 32 is a table of optical data for each lens element of the optical imaging lens of an eighth embodiment of the present disclosure;

FIG. 33 is a table of aspherical data of an eighth embodiment of the optical imaging lens according to the present disclosure;

FIG. 36 is a table of optical data for each lens element of the optical imaging lens of an ninth embodiment of the present disclosure;

FIG. 37 is a table of aspherical data of an ninth embodiment of the optical imaging lens according to the present disclosure;

FIG. 40 is a table of optical data for each lens element of the optical imaging lens of an tenth embodiment of the present disclosure;

FIG. 41 is a table of aspherical data of an tenth embodiment of the optical imaging lens according to the present disclosure;

FIG. 42 is a table for the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 of all ten example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
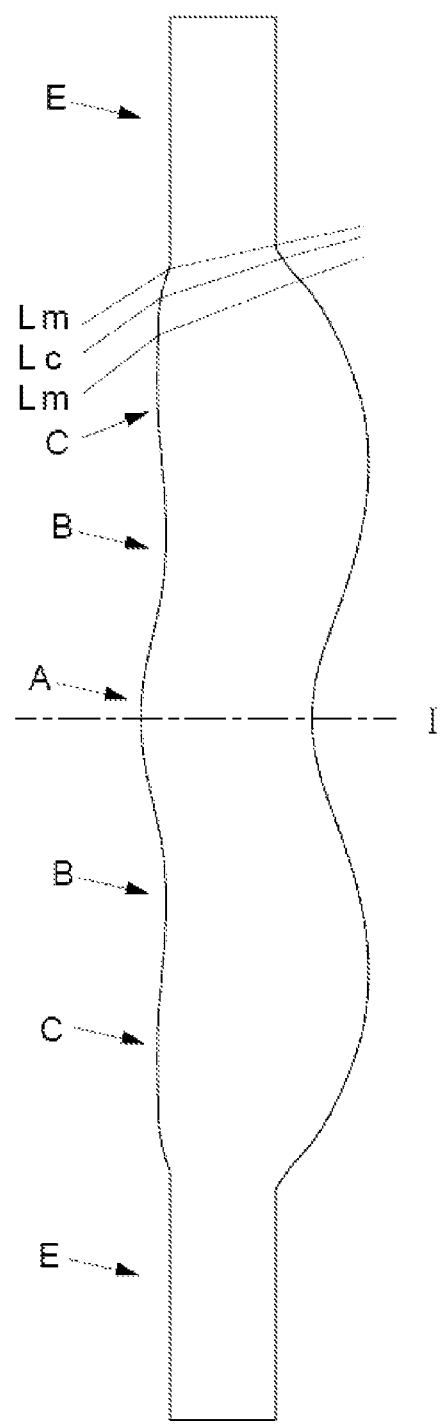
FIG. 1 is a cross-sectional view of one single lens element according to the present disclosure.

Here in the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, a third lens element, and a fourth lens element, each of the lens elements comprises refracting power, an object-side surface facing toward an object side, an image-side surface facing toward an image side and a central thickness defined along the optical axis. These lens elements may be arranged sequentially from the object side to the image side along an optical axis, and example embodiments of the lens may comprise no other lenses having reflecting power beyond the four lens elements. In an example embodiment: the first lens element has positive refracting power, the object-side surface thereof comprises a convex portion in a vicinity of the optical axis, and the image-side surface thereof comprises a convex portion in a vicinity of the optical axis; the second lens element has negative refracting power, the object-side surface thereof comprises a concave portion in a vicinity of a periphery of the second lens element, and the image-side surface thereof comprises a concave portion in a vicinity of a periphery of the second lens element; the object-side surface of the third lens element is a concave surface, and the image-side surface thereof comprises a convex portion in a vicinity of the optical axis; and the fourth lens element is constructed by plastic material, and the object-side surface thereof comprises a convex portion in a vicinity of a periphery of the fourth lens element.

Preferably, the lens elements are designed in light of the optical characteristics and the length of the optical imaging lens. For example, the first lens element having positive refracting power is formed with the convex portions in a vicinity of the optical axis on the both object-side and image-side surfaces may assist in collecting light to shorten the length of the optical imaging lens. Combining this with the second lens element having negative refracting power and all the details of shape on the surfaces of the lens elements listed here, such as the concave portions in a vicinity of a periphery of the second lens element formed both on the object-side and image-side surfaces thereof, the concave surface formed on the object-side surface of the third lens element, the convex portion in a vicinity of the optical axis formed on the image-side surface of the third lens element and the convex portion in a vicinity of a periphery of the fourth lens element formed on the object-side surface thereof, aberration of the optical imaging lens could be further adjusted. The fourth lens element constructed by plastic material may reduce the weight as well as the cost of the optical imaging lens.

In another exemplary embodiment, some equation(s) of parameters, such as those relating to the ratio among parameters could be taken into consideration. For example, an air gap between the first lens element and the second lens element along the optical axis, AC12, an air gap between the third lens element and the fourth lens element along the optical axis, AC34, and an effective focal length of the optical imaging lens, EFL, could be controlled to satisfy the equation as follows:

$$EFL/(AC12+AC34) \leq 20.00 \quad \text{Equation (1); or}$$

AC12, AC34, and a central thickness of the second lens element along the optical axis, CT2, could be controlled to satisfy the equation as follows:

$$CT2/(AC12+AC34) \leq 1.45 \quad \text{Equation (2); or}$$

The central thickness of the fourth lens element along the optical axis, CT4, and the distance between the object-side surface of the first lens element and the image-side surface of the fourth lens element, TL, could be controlled to satisfy the equation as follows:

$$TL/CT4 \leq 7.00 \quad \text{Equation (3); or}$$

TL and an air gap between the second lens element and the third lens element along the optical axis, AC23, could be controlled to satisfy the equation as follows:

$$TL/AC23 \leq 5.80 \quad \text{Equation (4); or}$$

EFL and the central thickness of the third lens element along the optical axis, CT3, could be controlled to satisfy the equation as follows:

$$EFL/CT3 \leq 5.90 \quad \text{Equation (5); or}$$

AC12, AC34 and the sum of the thickness of all four lens elements along the optical axis, ALT, could be controlled to satisfy the equation as follows:

$$ALT/(AC12+AC34) \leq 9.90 \quad \text{Equation (6); or}$$

CT2, CT3 and AC23 could be controlled to satisfy the equation as follows:

$$3.40 \leq (AC23+CT3)/CT2 \quad \text{Equation (7); or}$$

$$3.80 \leq (AC23+CT3)/CT2 \quad \text{Equation (7'); or}$$

CT2 and CT4 could be controlled to satisfy the equation as follows:

$$1.40 \leq CT4/CT2 \quad \text{Equation (8); or}$$

CT2 and the sum of all three air gaps from the first lens element to the fourth lens element along the optical axis, AAG, could be controlled to satisfy the equation as follows:

$$2.55 \leq AAG/CT2 \quad \text{Equation (9); or}$$

CT2 and CT3 could be controlled to satisfy the equation as follows:

$$1.90 \leq CT3/CT2 \quad \text{Equation (10); or}$$

CT2, CT3 and AAG could be controlled to satisfy the equation as follows:

$$4.80 \leq (AAG+CT3)/CT2 \quad \text{Equation (11).}$$

Aforesaid exemplary embodiments are not limited and could be selectively incorporated in other embodiments described herein.

Reference is now made to Equation (1). Considering that shortening the value of EFL is beneficial to shortening the length of the optical imaging lens and AC12 and AC34 require for a certain value to expand the light therebetween onto a proper level when entering the second/fourth lens element, the value of EFL has more potential than that of AC12 or AC34 to be shortened. Here the value of EFL/(AC12+AC34) is suggested for an upper limit, such as 20.00 to satisfy Equation (1), and preferably, it is suggested to be within 8.0~20.00.

Reference is now made to Equation (2). Considering that the second lens element is open to a comparative thin thickness for the comparative small effective diameter for passing light therein and AC12 and AC34 require for a certain value to expand the light therebetween onto a proper level when entering the second/fourth lens element, here the value of CT2/(AC12+AC34) is suggested for an upper limit, such as 1.45 to satisfy Equation (2), and preferably, it is suggested to be within 0.5~1.45.

Reference is now made to Equation (3). Considering that the shortening of TL may assist in shortening the length of the optical imaging lens and the value of CT4 is required for sustaining a certain thickness of the fourth lens element having comparative great effective diameter for passing light, here TL/CT4 is suggested for an upper limit, such as 7.00 to satisfy Equation (3), and preferably, it is suggested to be within 5.00~7.00.

Reference is now made to Equations (4). Considering that the shortening of TL may assist in shortening the length of the optical imaging lens and the shortening of AC23 is limited by the concave shapes on the image-side surface of the second lens element and the object-side surface of the third lens element, therefore, the value of TL/AC23 is suggested for an upper limit, such as 5.80 to satisfy Equation (4), and preferably, it is suggested to be within 4.50~5.80.

Reference is now made to Equation (5). Considering that shortening the value of EFL is beneficial to shortening the length of the optical imaging lens and the shortening of the thickness of the third lens element has comparative little potential, here the value of EFL/CT3 is suggested for an upper limit, such as 5.90 to satisfying Equation (5), and preferably, it is suggested to be limited by a lower limit, such as within 3.50~5.90.

Reference is now made to Equation (6). Considering shortening the value of ALT is beneficial to shortening the length of the optical imaging lens and AC12 and AC34 require for a certain value to expand the light therebetween onto a proper level when entering the second/fourth lens element, here the value of ALT/(AC12+AC34) is suggested to be limited by an upper limit, such as 9.90 to satisfying Equation (6), and preferably, it is suggested to be within 5.00~9.90.

Reference is now made to Equations (7) and (7'). Considering that the second lens element is open to a comparative thin thickness for the comparative small effective diameter for passing light therein and the shortening of AC23 is limited by the concave shapes on the image-side surface of the second lens element and the object-side surface of the third lens element, here the value of (AC23+CT3)/CT2 is suggested to be limited by a lower limit, such as 3.40 to satisfying Equation (7), and preferably, it is suggested to be within 3.40~6.50; however, when the value of (AC23+CT3)/CT2 is further limited by another lower limit, such as 3.80 to satisfying Equation (7'), the thickness of the second lens element could be shortened even more to facilitate the configuration of the values of other parameters.

Reference is now made to Equation (8). Considering the shortening of the thickness of the fourth lens element has less potential than that of the second lens element, here the value of CT4/CT2 is suggested for a lower limit, such as 1.40 to satisfying Equation (8), and preferably, it is suggested to be within 1.40~2.60.

Reference is now made to Equation (9). Considering the arrangement of the path of the imaging light and the difficulty faced in the manufacture procedure both of which limits the potential of shortening of the value of AAG more than that of CT2, here the value of AAG/CT2 is suggested for a lower limit, such as 2.55 to satisfying Equation (9), and preferably, it is suggested to be within 2.55~4.50.

Reference is now made to Equation (10). Considering that the imaging quality and the difficulty faced in the manufacture procedure both of which limits the potential of shortening of the value of CT3 more than that of CT2, here the value of CT3/CT2 is suggested for a lower limit, such as 1.90 to satisfying Equation (10), and preferably, it is suggested to be within 1.90~4.00.

Reference is now made to Equation (11). Considering that the arrangement of the path of the imaging light and the difficulty faced in the manufacture procedure both of which limits the potential of shortening of the value of AAG and CT3 more than that of CT2, here the value of (AAG+CT3)/CT2 is suggested for a lower limit, such as 4.80 to satisfying Equation (11), and preferably, it is suggested to be within 4.80~8.00.

When implementing example embodiments, more details about the convex or concave surface, refracting power and/or the position of an aperture stop could be incorporated for one specific lens element or broadly for plural lens elements to enhance the control for the system performance and/or resolution. It is noted that the details listed here could be incorporated in example embodiments if no inconsistency occurs.

Figure 2:
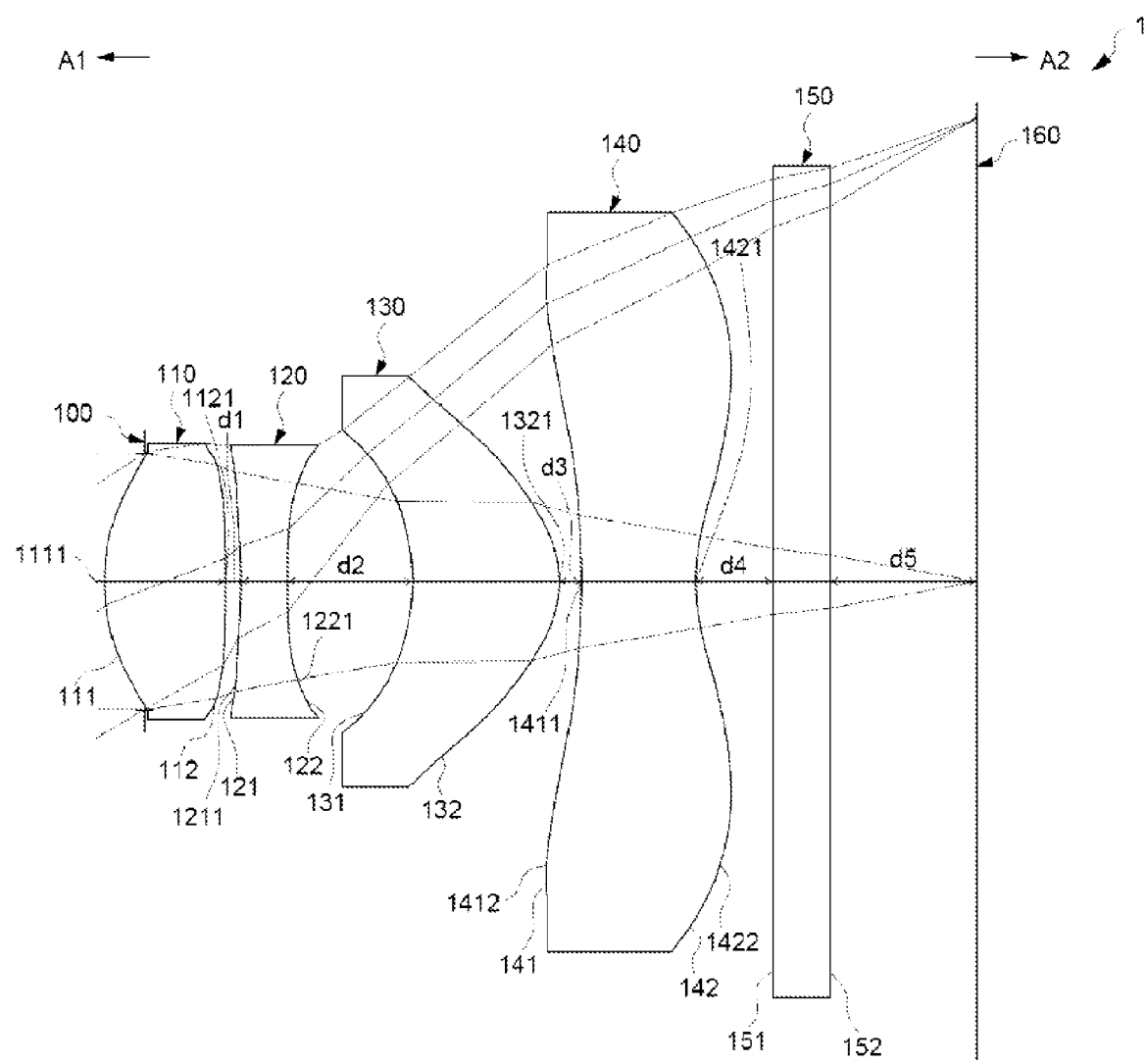
FIG. 2 is a cross-sectional view of a first embodiment of an optical imaging lens having four lens elements according to the present disclosure.
Figure 3:
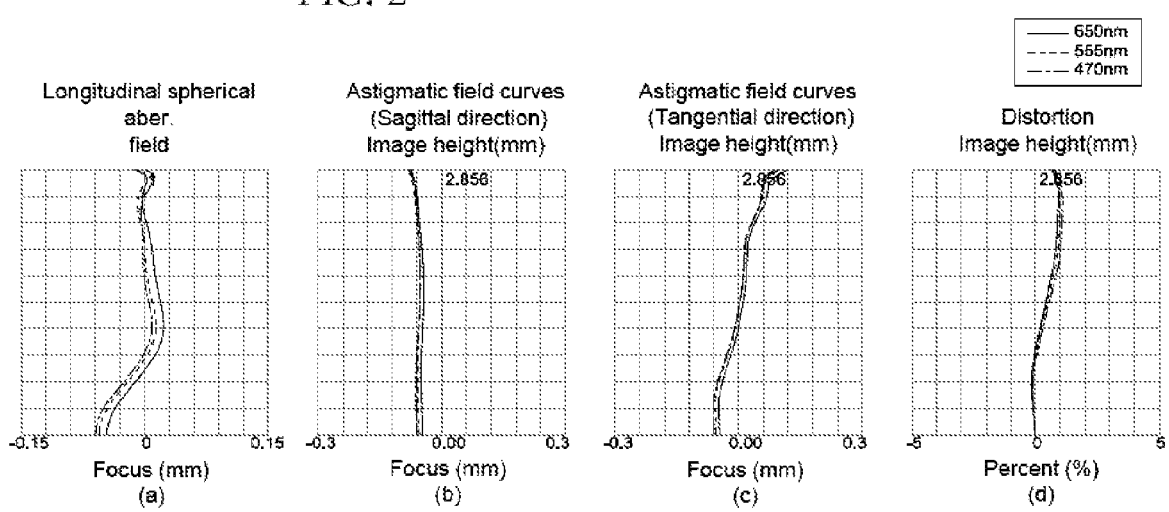
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characters and a shortened length. Reference is now made to FIGS. 2-5. FIG. 2 illustrates an example cross-sectional view of an optical imaging lens 1 having four lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2 along an optical axis, an aperture stop 100, a first lens element 110, a second lens element 120, a third lens element 130 and a fourth lens element 140. A filtering unit 150 and an image plane 160 of an image sensor are positioned at the image side A2 of the optical lens 1. Each of the first, second, third and fourth lens elements 110, 120, 130, 140 and the filtering unit 150 comprises an object-side surface 111/121/131/141/151 facing toward the object side A1 and an image-side surface 112/122/132/142/152 facing toward the image side A2. The example embodiment of the filtering unit 150 illustrated is an IR cut filter (infrared cut filter) positioned between the fourth lens element 140 and an image plane 160. The filtering unit 150 selectively absorbs light with specific wavelength from the light passing optical imaging lens 1. For example, IR light is absorbed, and this will prohibit the IR light which is not seen by human eyes from producing an image on the image plane 160.

Please noted that during the normal operation of the optical imaging lens 1, the distance between any two adjacent lens elements of the first, second, third and fourth lens elements 110, 120, 130, 140 is a unchanged value, i.e. the optical imaging lens 1 is a prime lens.

Exemplary embodiments of each lens element of the optical imaging lens 1 which may be constructed by plastic material will now be described with reference to the drawings.

An example embodiment of the first lens element 110 has positive refracting power. The object-side surface 111 is a convex surface comprising a convex portion 1111 in a vicinity of the optical axis and a convex portion in a vicinity of the periphery of the first lens element 110. The image-side surface 112 is a convex surface comprising a convex portion 1121 in a vicinity of the optical axis and a convex portion in a vicinity of the periphery of the first lens element 110.

An example embodiment of the second lens element 120 has negative refracting power. The object-side surface 121 is a concave surface comprising a concave portion 1211 in a vicinity of a periphery of the second lens element 120 and a concave portion in a vicinity of the optical axis. The image-side surface 122 is a concave surface comprising a concave portion 1221 in a vicinity of a periphery of the second lens element 120 and a concave portion in a vicinity of the optical axis.

An example embodiment of the third lens element 130 has positive refracting power. The object-side surface 131 is a concave surface comprising a concave portion in a vicinity of the optical axis and a concave portion in a vicinity of the periphery of the third lens element 130, and the image-side surface 132 is a convex surface comprising a convex portion 1321 in a vicinity of the optical axis and a convex portion in a vicinity of the periphery of the third lens element 130.

An example embodiment of the fourth lens element 140 has negative refracting power. The object-side surface 141 comprises a concave portion 1411 in a vicinity of the optical axis and a convex portion 1412 in a vicinity of a periphery of the fourth lens element 140. The image-side surface 142 comprises a concave portion 1421 in a vicinity of the optical axis and a convex portion 1422 in a vicinity of a periphery of the fourth lens element 140.

In example embodiments, air gaps exist between the lens elements 110, 120, 130, 140, the filtering unit 150 and the image plane 160 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the filtering unit 150 and the air gap d5 existing between the filtering unit 150 and the image plane 160 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by AC12, the air gap d2 is denoted by AC23, the air gap d3 is denoted by AC34 and the sum of d1, d2 and d3 is denoted by AAG.

FIG. 4 depicts the optical characters of each lens elements in the optical imaging lens 1 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:

ALT=2.241 (mm);
AAG=0.851 (mm);
TL=3.092 (mm);
EFL=3.760 (mm);
EFL/(AC12+AC34)=18.990;
CT2/(AC12+AC34)=1.242;
TL/CT4=5.145;
TL/AC23=4.735;
EFL/CT3=4.928;
ALT/(AC12+AC34)=11.318;
(AC23+CT3)/CT2=5.756;
CT4/CT2=2.443;
AAG/CT2=3.459;
CT3/CT2=3.102;
(AAG+CT3)/CT2=6.561.

The distance from the object-side surface 111 of the first lens element 110 to the image plane 160 along the optical axis is 4.562 mm, and the length of the optical imaging lens 1 is shortened.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130 and the object-side surface 141 and the image-side surface 142 of the fourth lens element 140 are all defined by the following aspherical formula:

$$Z(Y) = \frac{Y^2}{R}\left(1 + \sqrt{1 - (1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.06 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.15 mm. This reflects the optical imaging lens 1 of the present embodiment eliminates aberration effectively. Additionally, the closed curves represents dispersion is improved.

Please refer to FIG. 3, distortion aberration (d), which showing the variation of the distortion aberration is within ±2%. Such distortion aberration meets the requirement of acceptable image quality and shows the optical imaging lens 1 of the present embodiment could restrict the distortion aberration to raise the image quality even though the system length of the optical imaging lens 1 is shortened to 4.562 mm.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
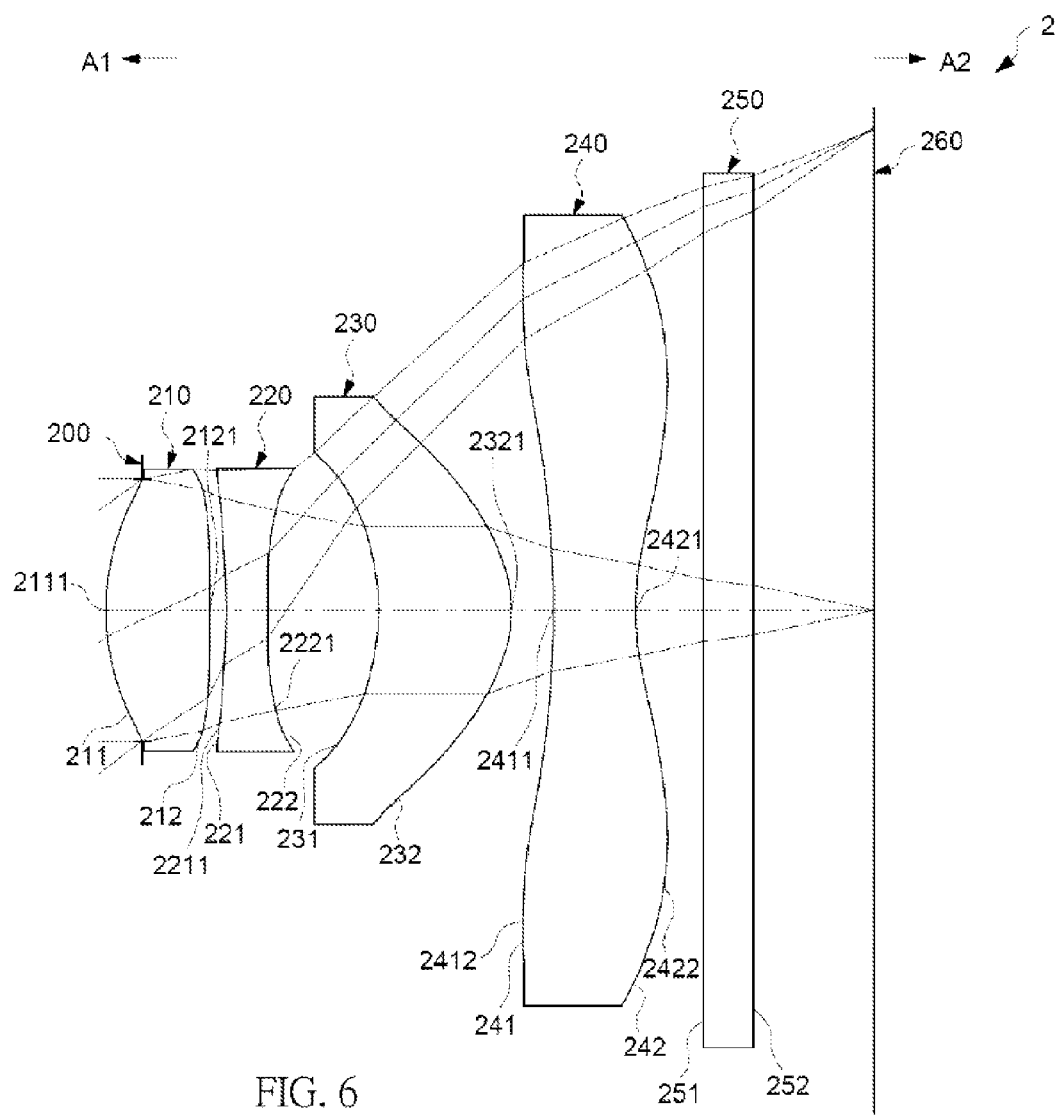
FIG. 6 is a cross-sectional view of a second embodiment of an optical imaging lens having four lens elements according to the present disclosure.
Figure 7:
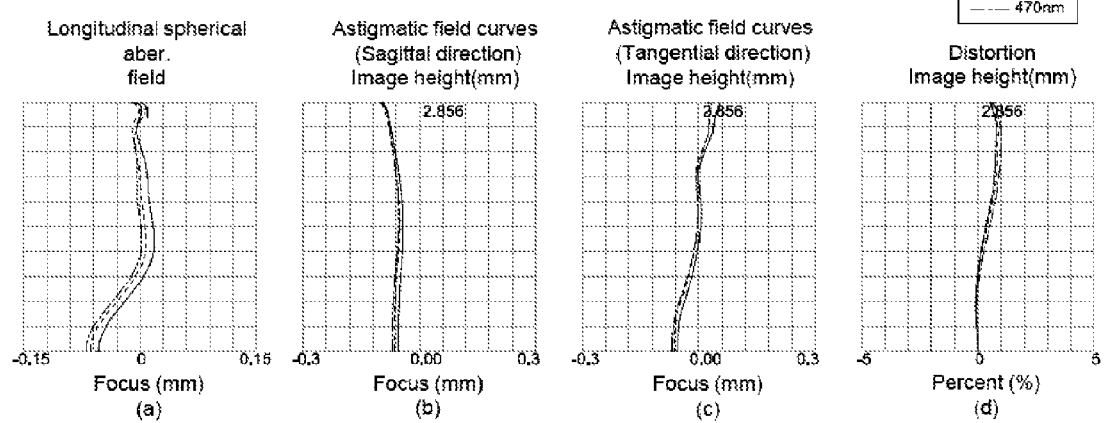
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having four lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises an aperture stop 200, a first lens element 210, a second lens element 220, a third lens element 230 and a fourth lens element 240.

The differences between the second embodiment and the first embodiment are the radius of curvature and thickness of each lens element and the distance of each air gap, but the configuration of the positive/negative refracting power of the first, second, third and fourth lens elements 210, 220, 230, 240 and configuration of the concave/convex shape of surfaces, comprising the object-side surfaces 211, 221, 231, 241 facing to the object side A1 and the image-side surfaces 212, 222, 232, 242 facing to the image side A2, are similar to those in the first embodiment. Please refer to FIG. 8 for the optical characteristics of each lens elements in the optical imaging lens 2 the present embodiment, the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:

ALT=2.137 (mm);
AAG=0.990 (mm);
TL=3.127 (mm);
EFL=3.721 (mm);

EFL/(AC12+AC34)=10.944;
CT2/(AC12+AC34)=0.729;
TL/CT4=6.421;
TL/AC23=4.811;
EFL/CT3=4.722;
ALT/(AC12+AC34)=6.285;
(AC23+CT3)/CT2=5.798;
CT4/CT2=1.964;
AAG/CT2=3.992;
CT3/CT2=3.177;
(AAG+CT3)/CT2=7.169.

The distance from the object-side surface 211 of the first lens element 210 to the image plane 260 along the optical axis is 4.535 mm and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
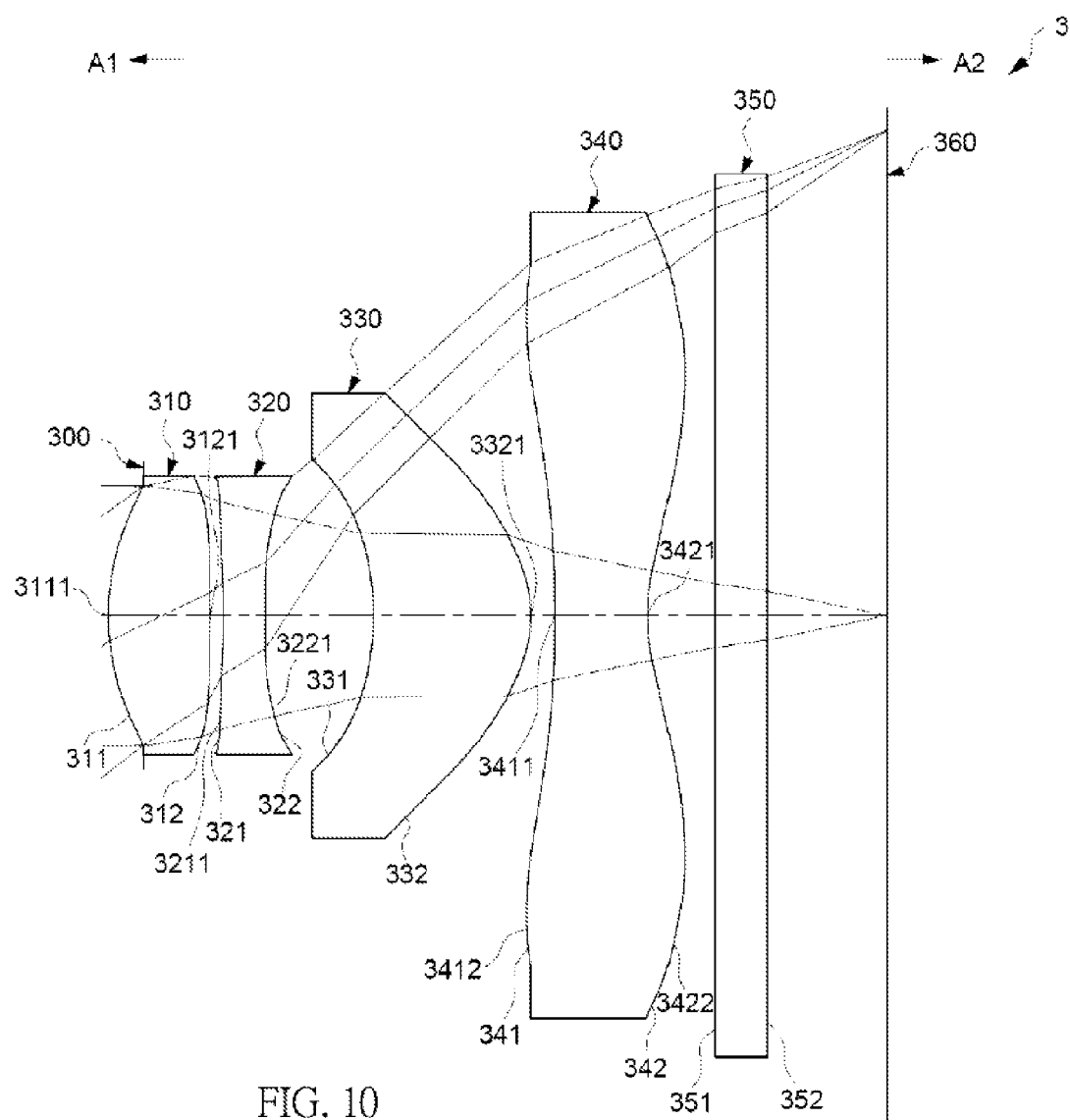
FIG. 10 is a cross-sectional view of a third embodiment of an optical imaging lens having four lens elements according to the present disclosure.
Figure 11:
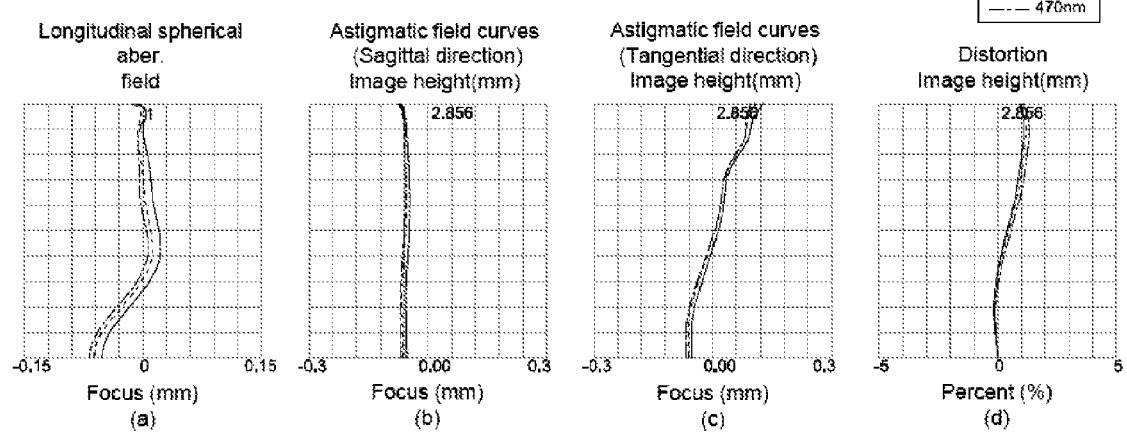
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having four lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises an aperture stop 300, a first lens element 310, a second lens element 320, a third lens element 330 and a fourth lens element 340.

The differences between the third embodiment and the first embodiment are the radius of curvature and thickness of each lens element and the distance of each air gap, but the configuration of the positive/negative refracting power of the first, second, third and fourth lens elements 310, 320, 330, 340 and configuration of the concave/convex shape of surfaces, comprising the object-side surfaces 311, 321, 331, 341 facing to the object side A1 and the image-side surfaces 312, 322, 332, 342 facing to the image side A2, are similar to those in the first embodiment. Please refer to FIG. 12 for the optical characteristics of each lens elements in the optical imaging lens 3 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:
  ALT=2.310 (mm);
  AAG=0.858 (mm);
  TL=3.168 (mm);
  EFL=3.672 (mm);

EFL/(AC12+AC34)=16.541;
CT2/(AC12+AC34)=1.117;
TL/CT4=5.824;
TL/AC23=4.981;
EFL/CT3=3.991;
ALT/(AC12+AC34)=10.405;
(AC23+CT3)/CT2=6.274;
CT4/CT2=2.194;
AAG/CT2=3.460;
CT3/CT2=3.710;
(AAG+CT3)/CT2=7.169.

The distance from the object-side surface 311 of the first lens element 310 to the image plane 360 along the optical axis is 4.566 mm and the length of the optical imaging lens 3 is shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
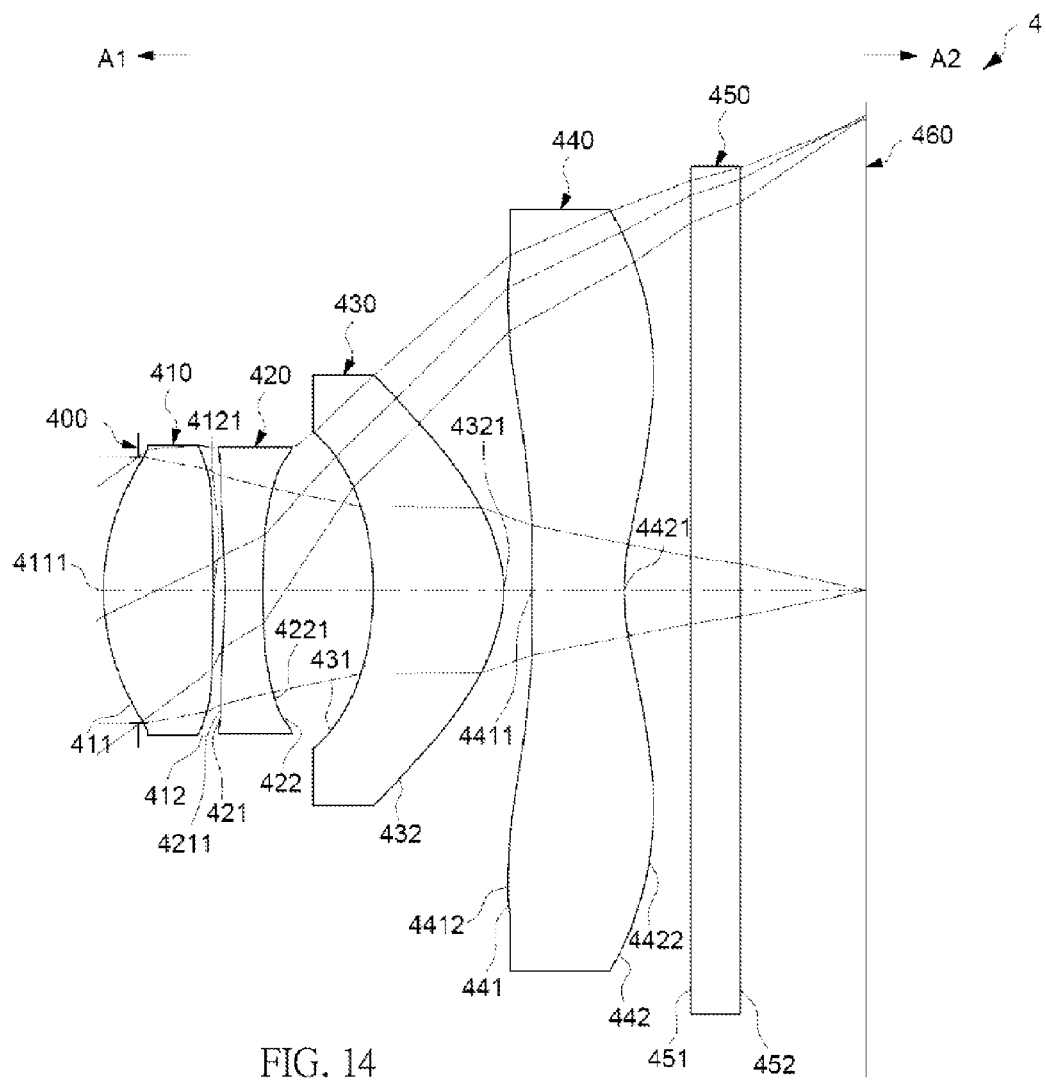
FIG. 14 is a cross-sectional view of a fourth embodiment of an optical imaging lens having four lens elements according to the present disclosure.
Figure 15:
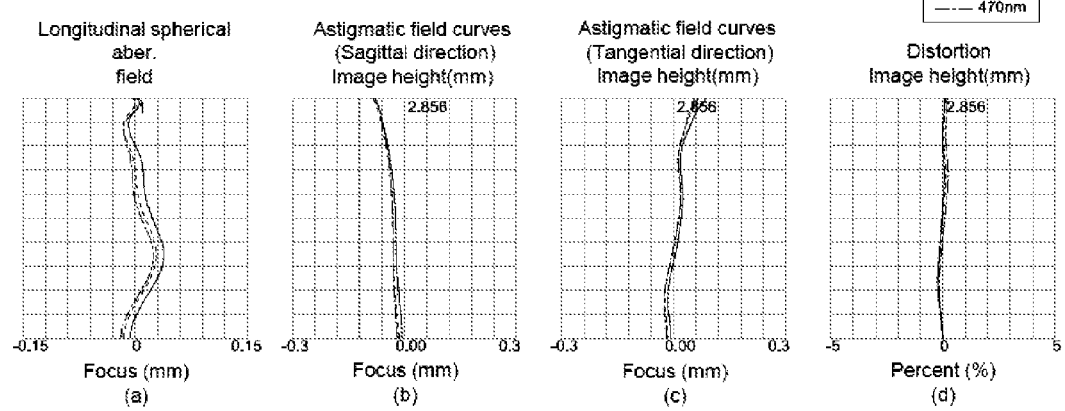
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having four lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises an aperture stop 400, a first lens element 410, a second lens element 420, a third lens element 430 and a fourth lens element 440.

The differences between the fourth embodiment and the first embodiment are the radius of curvature and thickness of each lens element and the distance of each air gap, but the configuration of the positive/negative refracting power of the first, second, third and fourth lens elements 410, 420, 430, 440 and configuration of the concave/convex shape of surfaces, comprising the object-side surfaces 411, 421, 431, 441 facing to the object side A1 and the image-side surfaces 412, 422, 432, 442 facing to the image side A2, are similar to those in the first embodiment. Please refer to FIG. 16 for the optical characteristics of each lens elements in the optical imaging lens 4 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:
  ALT=2.198 (mm);
  AAG=0.919 (mm);
  TL=3.117 (mm);
  EFL=3.845 (mm);

EFL/(AC12+AC34)=14.903;
CT2/(AC12+AC34)=0.891;
TL/CT4=5.709;
TL/AC23=4.716;
EFL/CT3=4.949;
ALT/(AC12+AC34)=8.519;
(AC23+CT3)/CT2=6.252;
CT4/CT2=2.374;
AAG/CT2=3.996;
CT3/CT2=3.378;
(AAG+CT3)/CT2=7.374.

The distance from the object-side surface 411 of the first lens element 410 to the image plane 460 along the optical axis is 4.564 mm and the length of the optical imaging lens 4 is shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
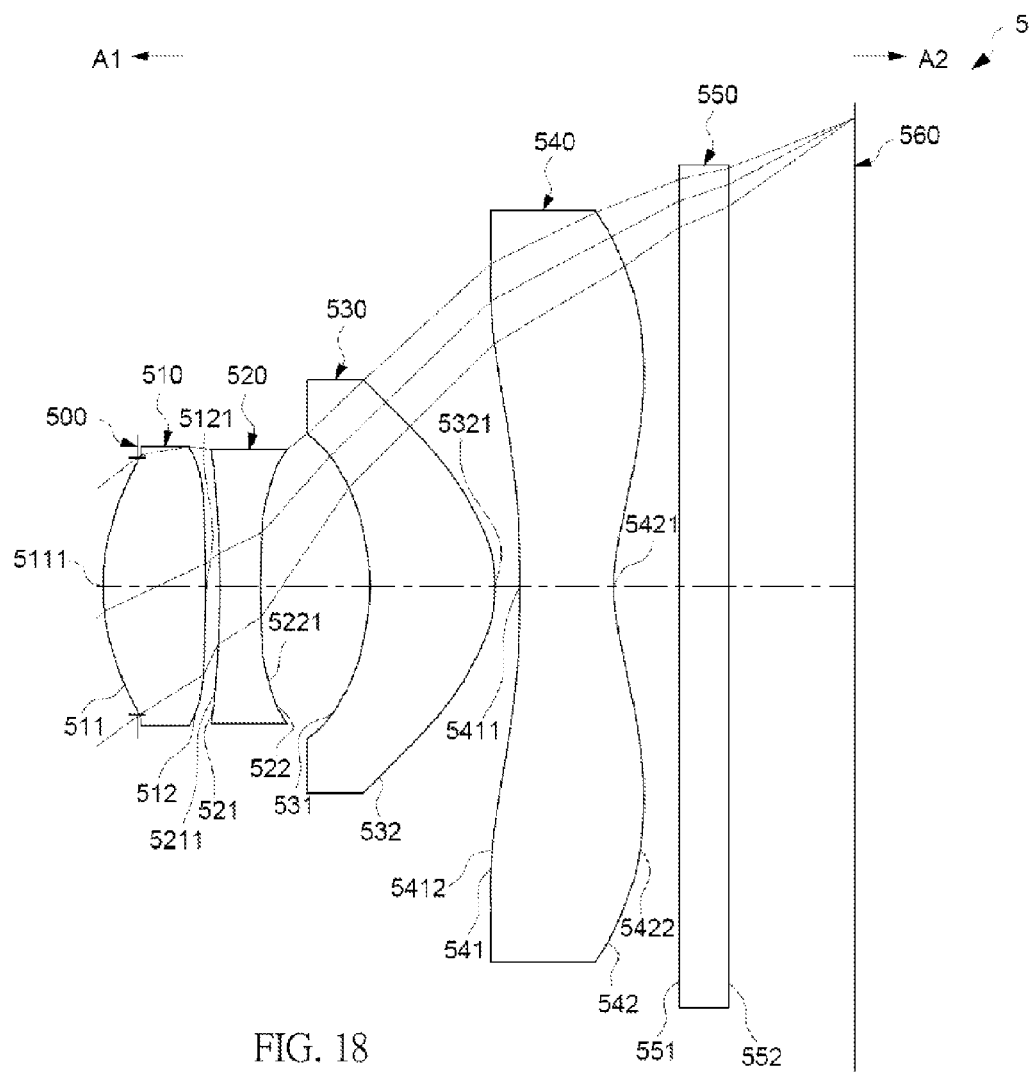
FIG. 18 is a cross-sectional view of a fifth embodiment of an optical imaging lens having four lens elements according to the present disclosure.
Figure 19:
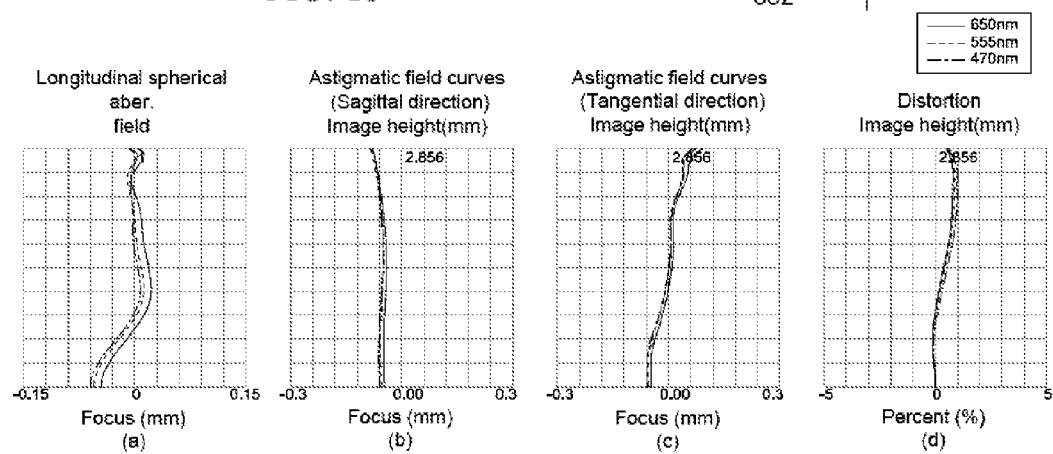
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having four lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises an aperture stop 500, a first lens element 510, a second lens element 520, a third lens element 530 and a fourth lens element 540.

The differences between the fifth embodiment and the first embodiment are the radius of curvature and thickness of each lens element and the distance of each air gap, but the configuration of the positive/negative refracting power of the first, second, third and fourth lens elements 510, 520, 530, 540 and configuration of the concave/convex shape of surfaces, comprising the object-side surfaces 511, 521, 531, 541 facing to the object side A1 and the image-side surfaces 512, 522, 532, 542 facing to the image side A2, are similar to those in the first embodiment. Please refer to FIG. 20 for the optical characteristics of each lens elements in the optical imaging lens 5 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:
 ALT=2.207 (mm);
 AAG=0.894 (mm);
 TL=3.101 (mm);
 EFL=3.767 (mm);

EFL/(AC12+AC34)=16.307;
CT2/(AC12+AC34)=1.065;
TL/CT4=5.384;
TL/AC23=4.677;
EFL/CT3=4.944;
ALT/(AC12+AC34)=9.554;
(AC23+CT3)/CT2=5.793;
CT4/CT2=2.341;
AAG/CT2=3.634;
CT3/CT2=3.098;
(AAG+CT3)/CT2=6.732.

The distance from the object-side surface 511 of the first lens element 510 to the image plane 560 along the optical axis is 4.560 mm and the length of the optical imaging lens 5 is shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
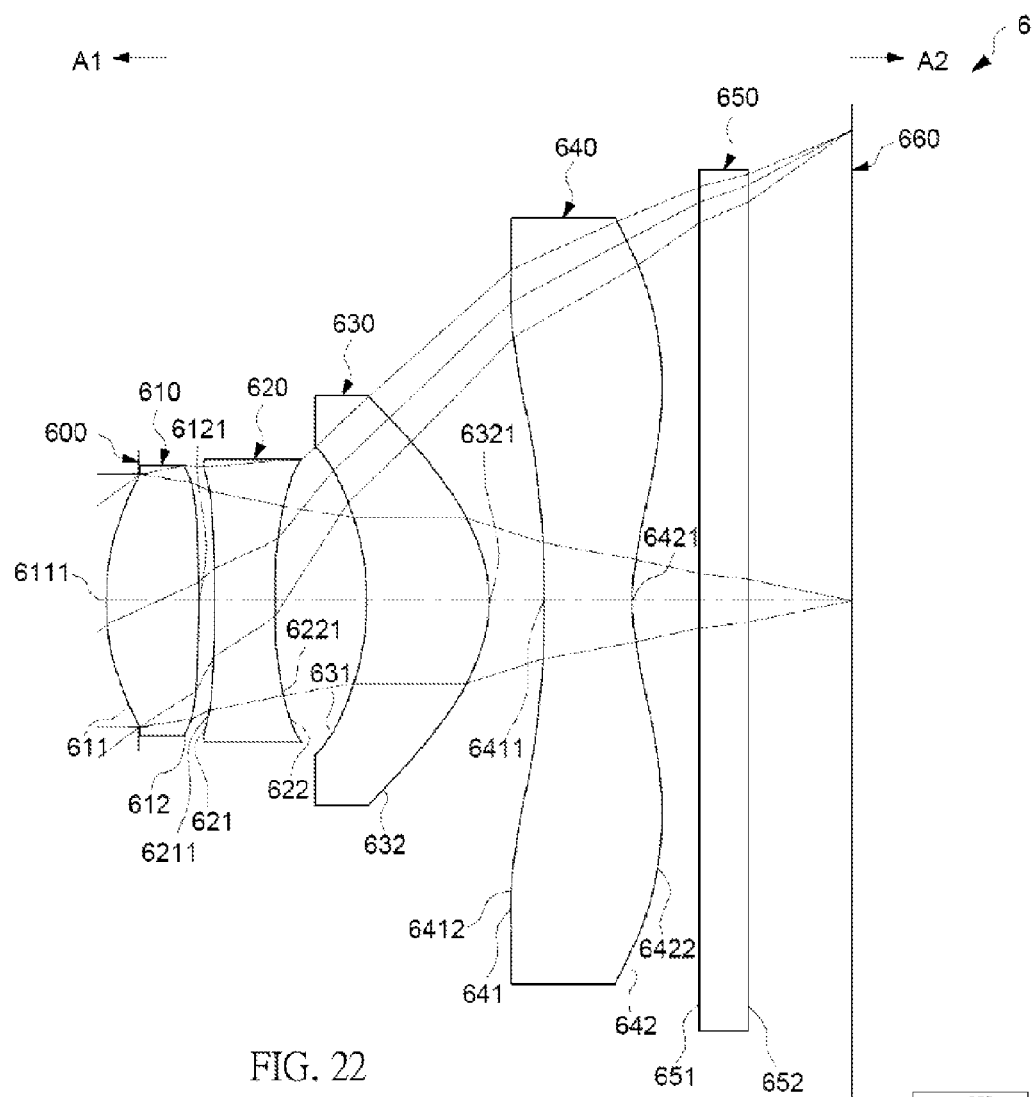
FIG. 22 is a cross-sectional view of a sixth embodiment of an optical imaging lens having four lens elements according to the present disclosure.
Figure 23:
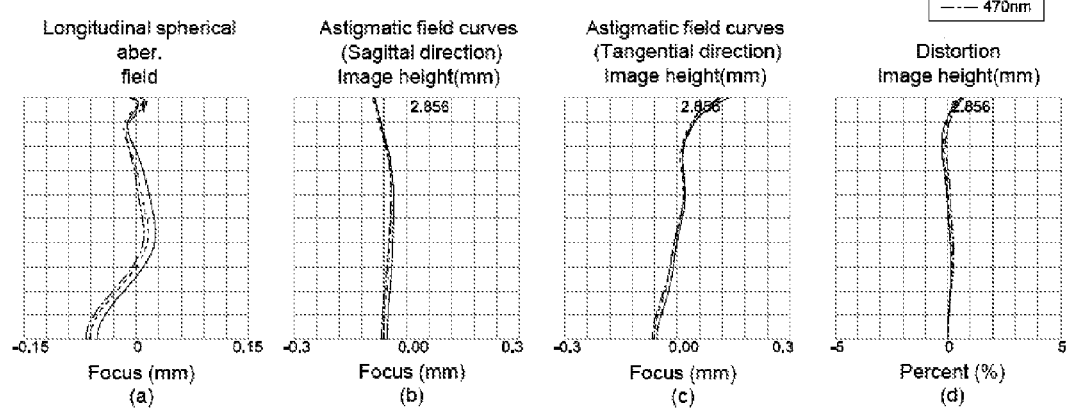
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having four lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises an aperture stop 600, a first lens element 610, a second lens element 620, a third lens element 630 and a fourth lens element 640.

The differences between the sixth embodiment and the first embodiment are the radius of curvature and thickness of each lens element and the distance of each air gap, but the configuration of the positive/negative refracting power of the first, second, third and fourth lens elements 610, 620, 630, 640 and configuration of the concave/convex shape of surfaces, comprising the object-side surfaces 611, 621, 631, 641 facing to the object side A1 and the image-side surfaces 612, 622, 632, 642 facing to the image side A2, are similar to those in the first embodiment. Please refer to FIG. 24 for the optical characteristics of each lens elements in the optical imaging lens 6 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:
 ALT=2.206 (mm);
 AAG=0.981 (mm);
 TL=3.187 (mm);
 EFL=3.673 (mm);

EFL/(AC12+AC34)=8.602;
CT2/(AC12+AC34)=0.871;
TL/CT4=5.957;
TL/AC23=5.753;
EFL/CT3=4.957;
ALT/(AC12+AC34)=5.166;
(AC23+CT3)/CT2=3.481;
CT4/CT2=1.438;
AAG/CT2=2.637;
CT3/CT2=1.992;
(AAG+CT3)/CT2=4.629.

The distance from the object-side surface 611 of the first lens element 610 to the image plane 660 along the optical axis is 4.512 mm and the length of the optical imaging lens 6 is shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Figure 26:
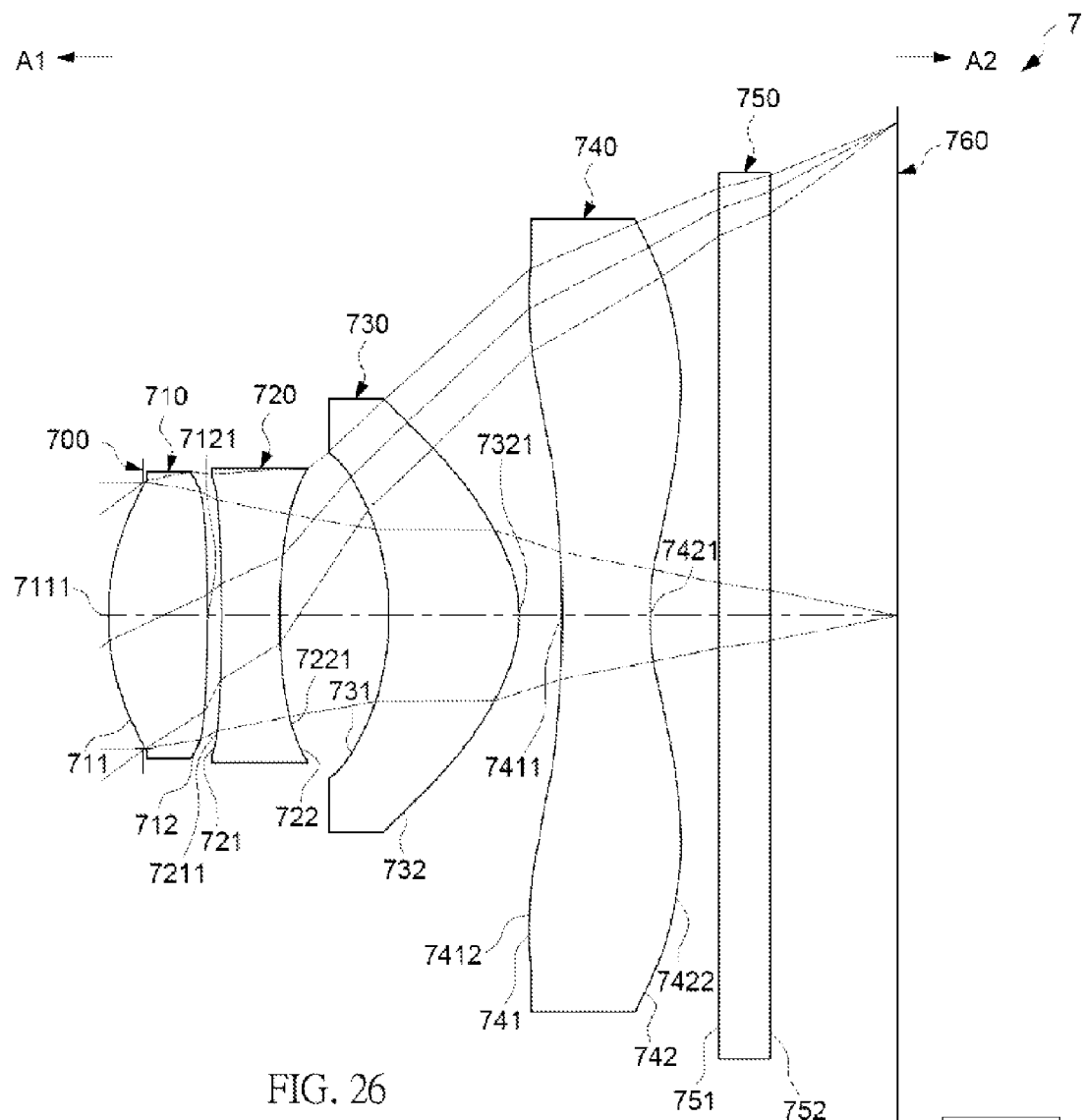
FIG. 26 is a cross-sectional view of a seventh embodiment of an optical imaging lens having four lens elements according to the present disclosure.
Figure 27:
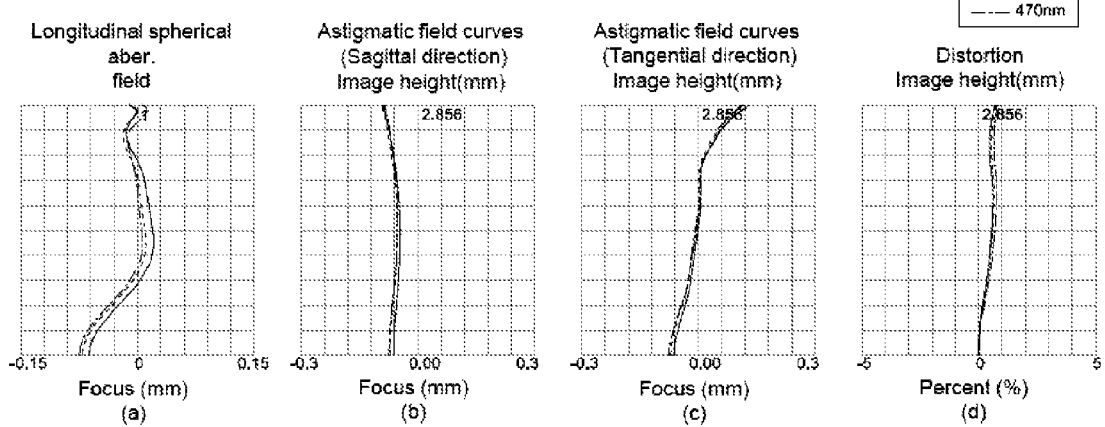
FIG. 27 is a chart of longitudinal spherical aberration and other kinds of optical aberrations of a seventh embodiment of the optical imaging lens according the present disclosure.

Reference is now made to FIGS. 26-29. FIG. 26 illustrates an example cross-sectional view of an optical imaging lens 7 having four lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises an aperture stop 700, a first lens element 710, a second lens element 720, a third lens element 730 and a fourth lens element 740.

The differences between the seventh embodiment and the first embodiment are the radius of curvature and thickness of each lens element and the distance of each air gap, but the configuration of the positive/negative refracting power of the first, second, third and fourth lens elements 710, 720, 730, 740 and configuration of the concave/convex shape of surfaces, comprising the object-side surfaces 711, 721, 731, 741 facing to the object side A1 and the image-side surfaces 712, 722, 732, 742 facing to the image side A2, are similar to those in the first embodiment. Please refer to FIG. 28 for the optical characteristics of each lens elements in the optical imaging lens 7 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:
ALT=2.163 (mm);
AAG=0.960 (mm);
TL=3.123 (mm);
EFL=3.712 (mm);

EFL/(AC12+AC34)=11.181;
CT2/(AC12+AC3)=1.012;
TL/CT4=6.196;
TL/AC23=4.973;
EFL/CT3=4.943;
ALT/(AC12+AC34)=6.515;
(AC23+CT3)/CT2=4.104;
CT4/CT2=1.500;
AAG/CT2=2.857;
CT3/CT2=2.235;
(AAG+CT3)/CT2=5.092.

The distance from the object-side surface 711 of the first lens element 710 to the image plane 760 along the optical axis is 4.552 mm and the length of the optical imaging lens 7 is shortened.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Figure 30:
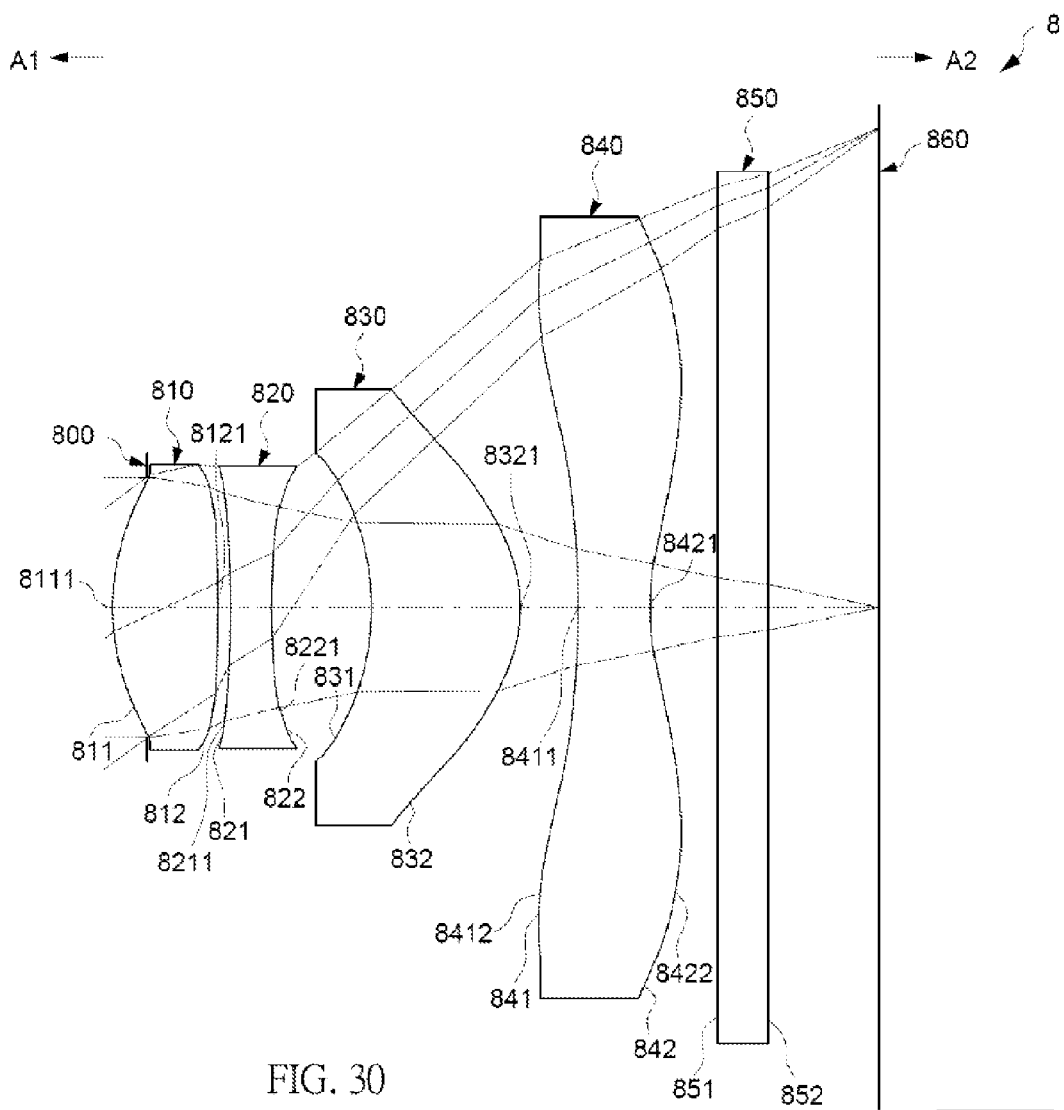
FIG. 30 is a cross-sectional view of an eighth embodiment of an optical imaging lens having four lens elements according to the present disclosure.
Figure 31:
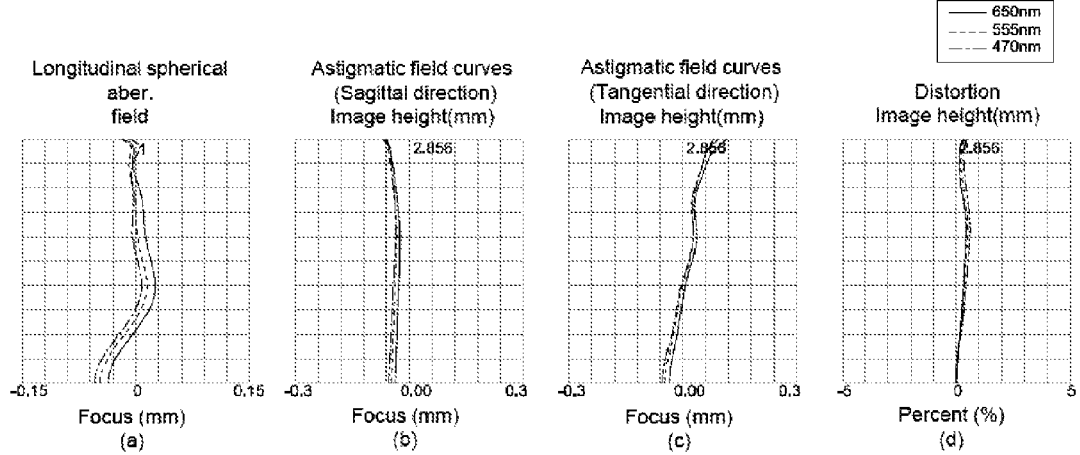
FIG. 31 is a chart of longitudinal spherical aberration and other kinds of optical aberrations of an eighth embodiment of the optical imaging lens according the present disclosure.

Reference is now made to FIGS. 30-33. FIG. 30 illustrates an example cross-sectional view of an optical imaging lens 8 having four lens elements of the optical imaging lens according to an eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises an aperture stop 800, a first lens element 810, a second lens element 820, a third lens element 830 and a fourth lens element 840.

The differences between the eighth embodiment and the first embodiment are the radius of curvature and thickness of each lens element and the distance of each air gap, but the configuration of the positive/negative refracting power of the first, second, third and fourth lens elements 810, 820, 830, 840 and configuration of the concave/convex shape of surfaces, comprising the object-side surfaces 811, 821, 831, 841 facing to the object side A1 and the image-side surfaces 812, 822, 832, 842 facing to the image side A2, are similar to those in the first embodiment. Please refer to FIG. 32 for the optical characteristics of each lens elements in the optical imaging lens 8 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:
ALT=2.185 (mm);
AAG=1.005 (mm);
TL=3.190 (mm);
EFL=3.724 (mm);

EFL/(AC12+AC34)=8.909;
CT2/(AC12+AC34)=0.586;
TL/CT4=7.401;
TL/AC23=5.434;
EFL/CT3=4.194;
ALT/(AC12+AC34)=5.227;
(AC23+CT3)/CT2=6.020;
CT4/CT2=1.759;
AAG/CT2=4.102;
CT3/CT2=3.624;
(AAG+CT3)/CT2=7.727.

The distance from the object-side surface 811 of the first lens element 810 to the image plane 860 along the optical axis is 4.556 mm and the length of the optical imaging lens 8 is shortened.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 8 is effectively shortened.

Figure 34:
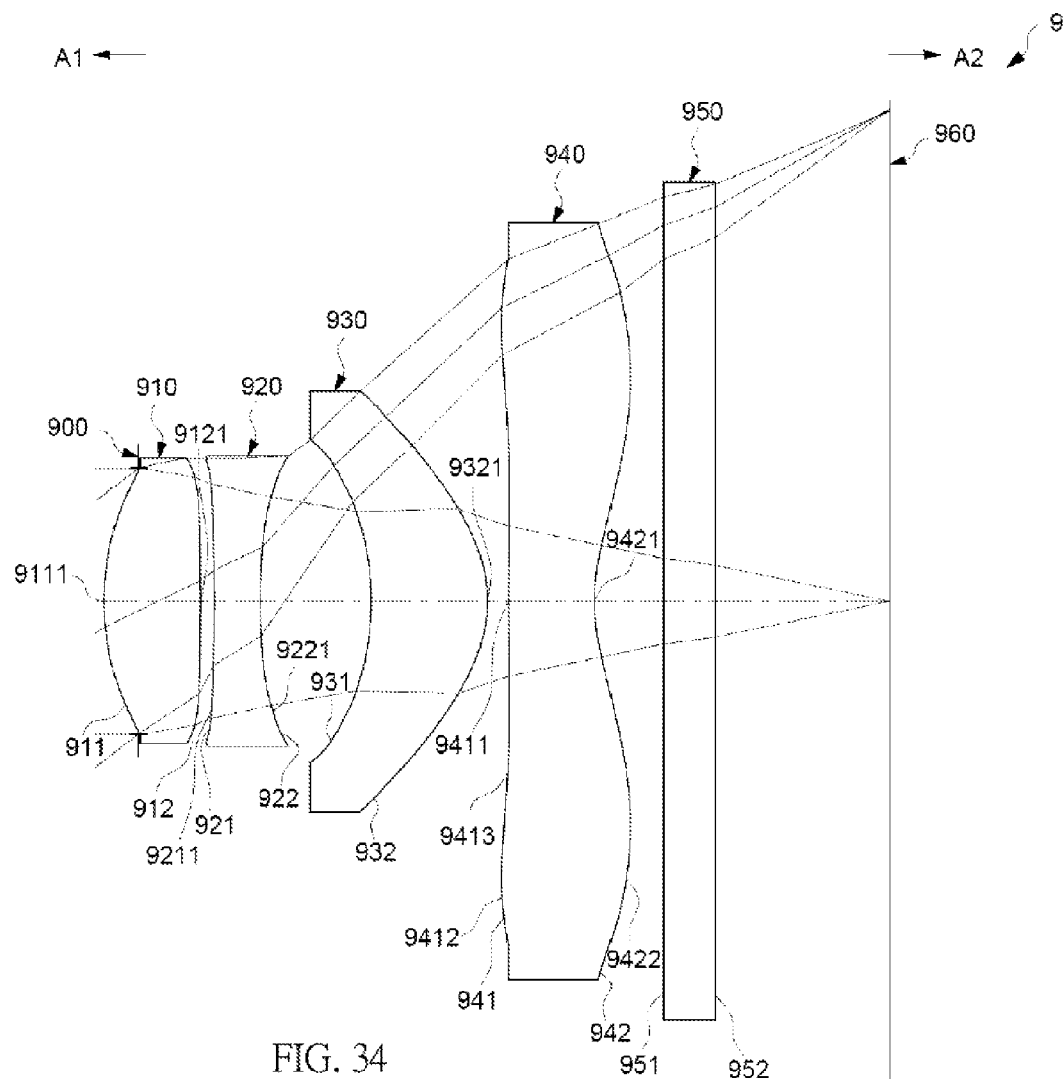
FIG. 34 is a cross-sectional view of an ninth embodiment of an optical imaging lens having four lens elements according to the present disclosure.
Figure 35:
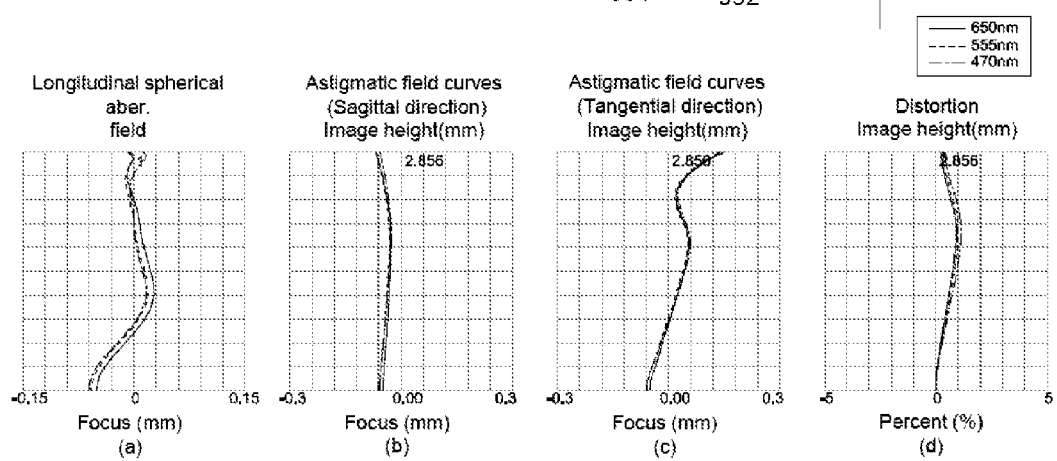
FIG. 35 is a chart of longitudinal spherical aberration and other kinds of optical aberrations of an ninth embodiment of the optical imaging lens according the present disclosure.

Reference is now made to FIGS. 34-37. FIG. 34 illustrates an example cross-sectional view of an optical imaging lens 9 having four lens elements of the optical imaging lens according to an ninth example embodiment. FIG. 35 shows example charts of longitudinal spherical aberration and other kinds of optical aberrations of the optical imaging lens 9 according to the ninth embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the optical imaging lens 9 of the present embodiment, in an order from an object side A1 to an image side A2 along an optical axis, comprises an aperture stop 900, a first lens element 910, a second lens element 920, a third lens element 930 and a fourth lens element 940.

The differences between the ninth embodiment and the first embodiment are the radius of curvature and thickness of each lens element, the distance of each air gap and the concave/convex shape of the object-side surface 941, but the configuration of the positive/negative refracting power of the first, second, third and fourth lens elements 910, 920, 930, 940 and configuration of the concave/convex shape of surfaces, comprising the object-side surfaces 911, 921, 931 facing to the object side A1 and the image-side surfaces 912, 922, 932, 942 facing to the image side A2, are similar to those in the first embodiment. Specifically, the object-side surface 941 of the fourth lens element 940 comprises a convex portion 9411 in a vicinity of the optical axis, a convex portion 9412 in a vicinity of a periphery of the fourth lens element 940 and a concave portion 9413 between the vicinity of the optical axis and the vicinity of the periphery of the fourth lens element 940. Please refer to FIG. 36 for the optical characteristics of each lens elements in the optical imaging lens 9 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:
ALT=1.995 (mm);
AAG=0.848 (mm);
TL=2.843 (mm);
EFL=3.701 (mm);
EFL/(AC12+AC34)=18.232;
CT2/(AC12+AC34)=1.296;
TL/CT4=5.709;
TL/AC23=4.408;
EFL/CT3=5.532;
ALT/(AC12+AC34)=9.828;
(AC23+CT3)/CT2=4.996;
CT4/CT2=1.894;
AAG/CT2=3.224;
CT3/CT2=2.544;
(AAG+CT3)/CT2=5.768.

The distance from the object-side surface 911 of the first lens element 910 to the image plane 960 along the optical axis is 4.553 mm and the length of the optical imaging lens 9 is shortened.

As shown in FIG. 35, the optical imaging lens 9 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 9 is effectively shortened.

Figure 38:
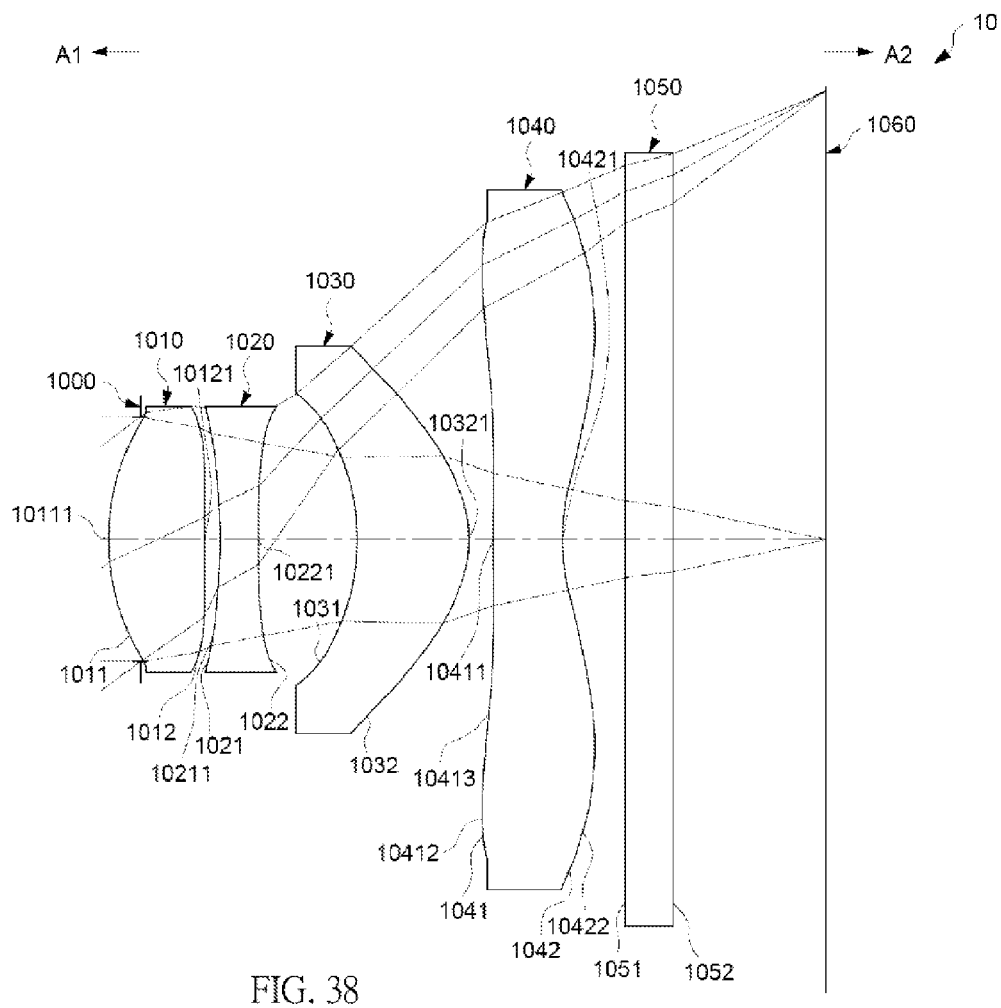
FIG. 38 is a cross-sectional view of an tenth embodiment of an optical imaging lens having four lens elements according to the present disclosure.
Figure 39:
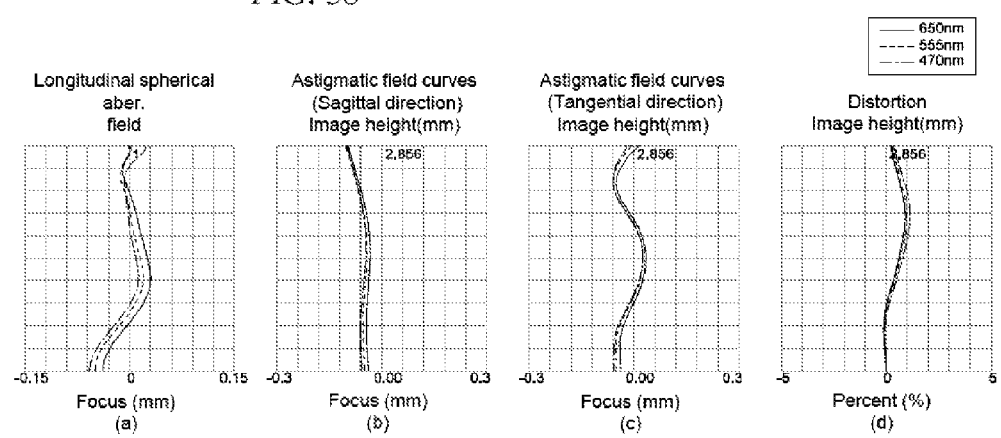
FIG. 39 is a chart of longitudinal spherical aberration and other kinds of optical aberrations of an tenth embodiment of the optical imaging lens according the present disclosure.

Reference is now made to FIGS. 38-41. FIG. 38 illustrates an example cross-sectional view of an optical imaging lens 10 having four lens elements of the optical imaging lens according to an tenth example embodiment. FIG. 39 shows example charts of longitudinal spherical aberration and other kinds of optical aberrations of the optical imaging lens 10 according to the tenth embodiment. FIG. 40 shows an example table of optical data of each lens element of the optical imaging lens 10 according to the tenth example embodiment. FIG. 41 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 38, the optical imaging lens 10 of the present embodiment, in an order from an object side A1 to an image side A2 along an optical axis, comprises an aperture stop 1000, a first lens element 1010, a second lens element 1020, a third lens element 1030 and a fourth lens element 1040.

The differences between the tenth embodiment and the first embodiment are the radius of curvature and thickness of each lens element, the distance of each air gap and the configuration of the concave/convex shape of the object-side surface 1041, but the configuration of the positive/negative refracting power of the first, second, third and fourth lens elements 1010, 1020, 1030, 1040 and configuration of the concave/convex shape of surfaces, comprising the object-side surfaces 1011, 1021, 1031 facing to the object side A1 and the image-side surfaces 1012, 1022, 1032, 1042 facing to the image side A2, are similar to those in the first embodiment. Specifically, the object-side surface 1041 of the fourth lens element 1040 comprises a convex portion 10411 in a vicinity of the optical axis, a convex portion 10412 in a vicinity of a periphery of the fourth lens element 1040 and a concave portion 10413 between the vicinity of the optical axis and the vicinity of the periphery of the fourth lens element 1040. Please refer to FIG. 40 for the optical characteristics of each lens elements in the optical imaging lens 10 of the present embodiment, wherein the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 are:

ALT=2.008 (mm);
AAG=0.872 (mm);
TL=2.880 (mm);
EFL=3.718 (mm);
EFL/(AC12+AC34)=14.754;
CT2/(AC12+AC34)=0.976;
TL/CT4=6.560;
TL/AC23=4.645;
EFL/CT3=5.222;
ALT/(AC12+AC34)=7.968;
(AC23+CT3)/CT2=5.415;
CT4/CT2=1.785;
AAG/CT2=3.545;
CT3/CT2=2.894;
(AAG+CT3)/CT2=6.439.

The distance from the object-side surface 1011 of the first lens element 1010 to the image plane 1060 along the optical axis is 4.555 mm and the length of the optical imaging lens 10 is shortened.

As shown in FIG. 31, the optical imaging lens 10 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 10 is effectively shortened.

Please refer to FIG. 42, which shows the values of ALT, AAG, TL, EFL, EFL/(AC12+AC34), CT2/(AC12+AC34), TL/CT4, TL/AC23, EFL/CT3, ALT/(AC12+AC34), (AC23+CT3)/CT2, CT4/CT2, AAG/CT2, CT3/CT2 and (AAG+CT3)/CT2 of all ten embodiments, and it is clear that the optical imaging lens of the present invention satisfy the Equations (1), (2), (3), (4), (5), (6), (7)/(7'), (8), (9), (10) and/or (11).

Figure 43:
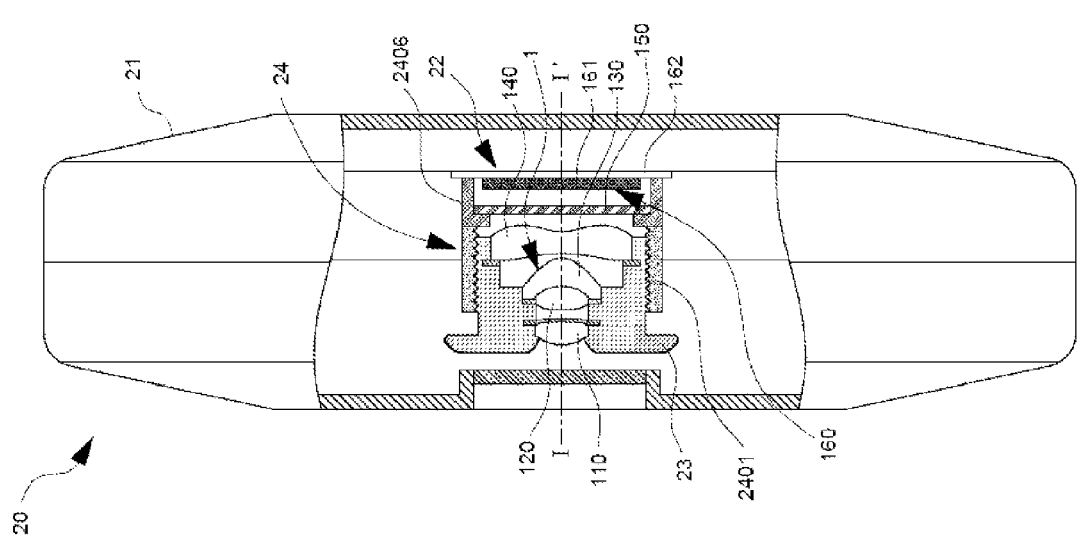
FIG. 43 is a structure of an example embodiment of a mobile device.

Reference is now made to FIG. 43, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 43, the photography module 22 may comprise an aforesaid optical imaging lens with four lens elements, which is a prime lens and for example the optical imaging lens 1 of the first embodiment, a lens barrel 23 for positioning the optical imaging lens 1, a module housing unit 24 for positioning the lens barrel 23, a substrate 162 for positioning the module housing unit 24, and an image sensor 161 which is positioned at an image side of the optical imaging lens 1. The image plane 160 is formed on the image sensor 161.

In some other example embodiments, the structure of the filtering unit 150 may be omitted. In some example embodiments, the housing 21, the lens barrel 23, and/or the module housing unit 24 may be integrated into a single component or assembled by multiple components. In some example embodiments, the image sensor 161 used in the present embodiment is directly attached to a substrate 162 in the form of a chip on board (COB) package, and such package is different from traditional chip scale packages (CSP) since COB package does not require a cover glass before the image sensor 161 in the optical imaging lens 1. Aforesaid exemplary embodiments are not limited to this package type and could be selectively incorporated in other described embodiments.

The four lens elements 110, 120, 130, 140 are positioned in the lens barrel 23 in the way of separated by an air gap between any two adjacent lens elements.

The module housing unit 24 comprises a lens backseat 2401 for positioning the lens barrel 23 and an image sensor base 2406 positioned between the lens backseat 2401 and the image sensor 161. The lens barrel 23 and the lens backseat 2401 are positioned along a same axis I-I', and the lens backseat 2401 is close to the outside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 4.562 mm, the size of the mobile device 20 may be quite small. Therefore, the embodiments described herein meet the market demand for smaller sized product designs.

Figure 44:
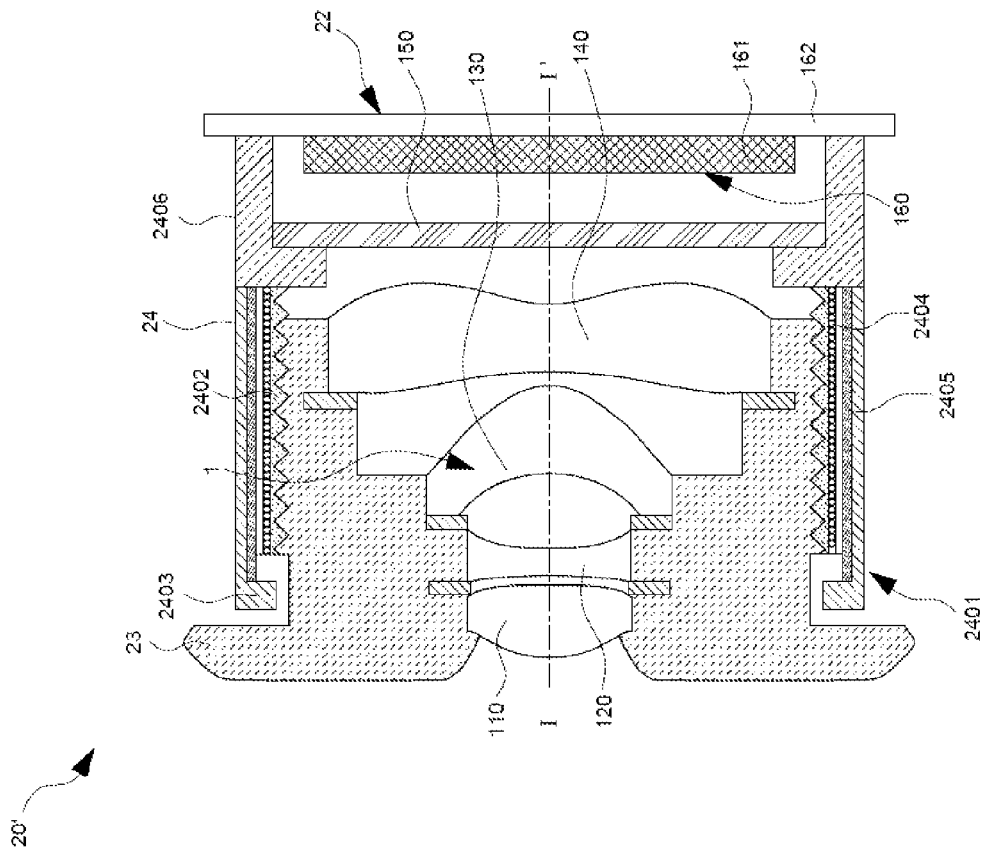
FIG. 44 is a partially enlarged view of the structure of another example embodiment of a mobile device.

Reference is now made to FIG. 44, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 4.562 mm, is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling the detail structure of the lens elements, the length of the optical imaging lens is effectively shortened and meanwhile good optical characters are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising:
   first, second, third and fourth lens elements, each of said first, second, third and fourth lens elements having refracting power, an object-side surface facing toward the object side, an image-side surface facing toward the image side and a central thickness defined along the optical axis, wherein:
   said first lens element has positive refracting power, said object-side surface thereof comprises a convex portion in a vicinity of the optical axis, and said image-side surface thereof comprises a convex portion in a vicinity of the optical axis;
   said second lens element has negative refracting power, said object-side surface thereof comprises a concave portion in a vicinity of a periphery of the second lens element, and said image-side surface thereof comprises a concave portion in a vicinity of a periphery of the second lens element;
   said third lens element has positive refracting power, said object-side surface of said third lens element is a concave surface, and said image-side surface thereof comprises a convex portion in a vicinity of the optical axis;
   said fourth lens element has negative refracting power, said fourth lens element is constructed by plastic material, and said object-side surface thereof comprises a convex portion in a vicinity of a periphery of the fourth lens element;
   wherein the optical imaging lens comprises no other lenses having reflecting refracting power beyond the four lens elements;
   wherein an air gap between the second lens element and the third lens element along the optical axis is larger than the central thickness of the fourth lens element along the optical axis; and
   wherein Fno is less than 2.46;
   wherein the sum of all three air gaps from the first lens element to the fourth lens element along the optical axis is AAG, the central thickness of the second lens element along the optical axis is CT2 and CT2 and AAG satisfy the equation:

$2.55 \leq AAG/CT2$.

2. The optical imaging lens according to claim 1, wherein an air gap between the first lens element and the second lens element along the optical axis is AC12, an air gap between the third lens element and the fourth lens element along the optical axis is AC34, an effective focal length of the optical imaging lens is EFL, and AC12, AC34 and EFL satisfy the equation:

$EFL/(AC12+AC34) \leq 20.00$.

3. The optical imaging lens according to claim 2, wherein AC12, AC34 and CT2 satisfy the equation:

$CT2/(AC12+AC34) \leq 1.45$.

4. The optical imaging lens according to claim 3, wherein the central thickness of the fourth lens element along the optical axis is CT4, the distance between the object-side surface of the first lens element and the image-side surface of the fourth lens element is TL, and CT4 and TL satisfy the equation:

$TL/CT4 \leq 7.00$.

5. The optical imaging lens according to claim 4, wherein an air gap between the second lens element and the third lens element along the optical axis is AC23, and TL and AC23 satisfy the equation:

$TL/AC23 \leq 5.80$.

6. The optical imaging lens according to claim 2, wherein the central thickness of the fourth lens element along the optical axis is CT4, the distance between the object-side surface of the first lens element and the image-side surface of the fourth lens element is TL, and CT4 and TL satisfy the equation:

$TL/CT4 \leq 7.00$.

7. The optical imaging lens according to claim 6, wherein the sum of the thickness of all four lens elements along the optical axis is ALT, and AC12, AC34 and ALT satisfy the equation:

$ALT/(AC12+AC34) \leq 9.90$.

8. The optical imaging lens according to claim 7, wherein an air gap between the second lens element and the third lens element along the optical axis is AC23, the central thickness of the third lens element along the optical axis is CT3, and CT2, CT3 and AC23 satisfy the equation:

$3.80 \leq (AC23+CT3)/CT2$.

9. The optical imaging lens according to claim 1, wherein an air gap between the first lens element and the second lens element along the optical axis is AC12, an air gap between the third lens element and the fourth lens element along the optical axis is AC34, and CT2, AC12 and AC34 satisfy the equation:

$CT2/(AC12+AC34) \leq 1.45$.

10. The optical imaging lens according to claim 9, wherein the central thickness of the fourth lens element along the optical axis is CT4, and CT2 and CT4 satisfy the equation:

$1.40 \leq CT4/CT2$.

11. The optical imaging lens according to claim 10, wherein an air gap between the second lens element and the third lens element along the optical axis is AC23, the central thickness of the third lens element along the optical axis is CT3, and CT2, CT3 and AC23 satisfy the equation:

$3.40 \leq (AC23+CT3)/CT2$.

12. The optical imaging lens according to claim 11, wherein an effective focal length of the optical imaging lens is EFL, and CT3 and EFL satisfy the equation:

$EFL/CT3 \leq 5.90$.

13. The optical imaging lens according to claim 1, wherein the central thickness of the fourth lens element along the optical axis is CT4, the distance between the object-side surface of the first lens element and the image-side surface of the fourth lens element is TL, and CT4 and TL satisfy the equation:

$TL/CT4 \leq 7.00$.

14. The optical imaging lens according to claim 13, wherein the central thickness of the third lens element along the optical axis is CT3, and CT2 and CT3 satisfy the equation:

$1.90 \leq CT3/CT2$.

15. A mobile device, comprising:
a housing; and
a photography module positioned in the housing and comprising:
an optical imaging lens, sequentially from an object side to an image side along an optical axis, comprising:
first, second, third and fourth lens elements, each of said first, second, third and fourth lens elements having refracting power, an object-side surface facing toward the object side, an image-side surface facing toward the image side and a central thickness defined along the optical axis, wherein:
said first lens element has positive refracting power, said object-side surface thereof comprises a convex portion in a vicinity of the optical axis, and said image-side surface thereof comprises a convex portion in a vicinity of the optical axis;
said second lens element has negative refracting power, said object-side surface thereof comprises a concave portion in a vicinity of a periphery of the second lens element, and said image-side surface thereof comprises a concave portion in a vicinity of a periphery of the second lens element;
said third lens element has positive refracting power, said object-side surface of said third lens element is a concave surface, and said image-side surface thereof comprises a convex portion in a vicinity of the optical axis;
said fourth lens element has negative refracting power, said fourth lens element is constructed by plastic material, and said object-side surface thereof comprises a convex portion in a vicinity of a periphery of the fourth lens element;
wherein the optical imaging lens comprises no other lenses having refracting power beyond the four lens elements;
wherein an air gap between the second lens element and the third lens element along the optical axis is larger than the central thickness of the fourth lens element along the optical axis; and
wherein Fno is less than 2.46;
wherein the sum of all three air gaps from the first lens element to the fourth lens element along the optical axis is AAG, the central thickness of the second lens element along the optical axis is CT2, and CT2 and AAG satisfy the equation:

$2.55 \leq AAG/CT2$ a lens barrel for positioning the optical imaging lens;
a module housing unit for positioning the lens barrel; and
an image sensor positioned at the image side of the optical imaging lens.

* * * * *